US008770045B2

(12) United States Patent
Murayama et al.

(10) Patent No.: US 8,770,045 B2
(45) Date of Patent: Jul. 8, 2014

(54) SENSOR ASSEMBLY AND SENSOR MODULE

(75) Inventors: Masaru Murayama, Komaki (JP);
Yuuki Saitou, Komaki (JP); Tomonori Hayakawa, Komaki (JP); Kazunobu Hashimoto, Nagoya (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 52 days.

(21) Appl. No.: 13/401,300

(22) Filed: Feb. 21, 2012

(65) Prior Publication Data
US 2012/0144935 A1 Jun. 14, 2012

Related U.S. Application Data
(63) Continuation of application No. PCT/JP2010/066130, filed on Sep. 17, 2010.

(30) Foreign Application Priority Data
Sep. 28, 2009 (JP) ................................ 2009-222119

(51) Int. Cl.
*G01L 1/00* (2006.01)
(52) U.S. Cl.
USPC .................... 73/862.626; 73/862.627; 73/431
(58) Field of Classification Search
USPC ...................... 73/862.626, 862.627, 862.625, 73/862.629, 862.474, 862.632, 431; 338/2, 5
See application file for complete search history.

(56) References Cited

U.S. PATENT DOCUMENTS

| 4,708,896 A | 11/1987 | Akao |
| 6,225,583 B1 | 5/2001 | Shigematsu et al. |
| 6,492,475 B1* | 12/2002 | Egashira et al. ............. 526/153 |
| 7,834,527 B2* | 11/2010 | Alvarez Icaza Rivera et al. ............................ 310/344 |
| 8,272,276 B2* | 9/2012 | Gorjanc et al. ........... 73/862.046 |
| 2008/0100046 A1 | 5/2008 | Hayakawa et al. |
| 2009/0015270 A1 | 1/2009 | Hayakawa et al. |
| 2011/0307214 A1 | 12/2011 | Saitou et al. |

FOREIGN PATENT DOCUMENTS

| DE | 3841243 A1 * | 6/1990 |
| JP | 62-041531 | 3/1987 |
| JP | 05-281665 | 10/1993 |
| JP | 06-050830 | 2/1994 |

(Continued)

OTHER PUBLICATIONS

Machine translation of Description and Claims of German Patent Application Publication DE 3841243 A to Brunner et al. from European Patent Office, EspaceNet., date of publication: Jun. 13, 1990.*

(Continued)

*Primary Examiner* — Lisa Caputo
*Assistant Examiner* — Roger Hernandez-Prewit
(74) *Attorney, Agent, or Firm* — Greenblum & Bernstein, P.L.C.

(57) ABSTRACT

A purpose is to provide a sensor assembly and a sensor module having a flexible sensor element that uses polymer material and having a component such as the sensor element and the like that hardly deteriorates and is superior in durability. A sensor assembly includes a sensor element and an exterior packaging bag enclosing the sensor element. The sensor element includes a sensor thin film made of resin or elastomer, and at least one pair of electrodes connected to the sensor thin film. The exterior packaging bag is made from laminate films having a metal foil and two resin layers arranged sandwiching the metal foil.

13 Claims, 17 Drawing Sheets

(56) References Cited

FOREIGN PATENT DOCUMENTS

| JP | 09-292299 | 11/1997 |
| JP | 2000-088677 | 3/2000 |
| JP | 2001-066371 | 3/2001 |
| JP | 2002-350250 | 12/2002 |
| JP | 2002350250 A * | 12/2002 |
| JP | 2004-239691 | 8/2004 |
| JP | 2008-107199 | 10/2006 |
| JP | 2007-153073 | 6/2007 |
| JP | 2008-142461 | 6/2008 |
| JP | 2008-175659 | 7/2008 |
| JP | 2008-227464 | 9/2008 |
| JP | 2009-020006 | 1/2009 |
| JP | 2009-200006 | 1/2009 |
| JP | 2009-190732 | 8/2009 |
| JP | 2009-198483 | 9/2009 |
| JP | 2009198483 A * | 9/2009 |

OTHER PUBLICATIONS

Machine translation of Bibliographic Data, Detailed Description and Description of Drawings of Japanese Patent Application Publication JP2002350250 to Kume et al. from European Patent Office, EspaceNet., date of publication: Dec. 4, 2002.*

Machine translation of Bibliographic Data, Detailed Description, Description of Drawings and Claims of Japanese Patent Application Publication JP2009198483 to Saito et al. from European Patent Office, EspaceNet., date of publication: Mar. 9, 2009.*

Authors: I. Novák, I. Krupa and I. Chodák, Title: Electroconductive adhesives based on epoxy and polyurethane resins filled with silver-coated inorganic fillers, Date: Mar. 4, 2004, Publisher: Elsevier, Science Direct from Synthetic Metals 144 (2004), pp. 13-19.*

* cited by examiner

SENSOR ASSEMBLY AND SENSOR MODULE

CLAIM FOR PRIORITY

This application is a continuation of PCT/JP2010/066130 filed Sep. 17, 2010, and claims the priority benefit of Japanese Application No. 2009-222119, filed Sep. 28, 2009, the contents of which is expressly incorporated by reference in its entirety.

TECHNICAL FIELD

The present invention relates to a sensor assembly having a flexible sensor element that uses a polymer material. More specifically, the present invention relates to a sensor assembly having a sensor component such as a sensor element or the like that is less likely to deteriorate and is superior in durability.

TECHNICAL BACKGROUND

As a means for detecting a vehicle collision and the like, there is a load sensor using optical fiber (for example, see Patent Document 1). In a load sensor of this type, when the optical fiber deforms due to a collision, loss of light transmitting from one end to the other end of the optical fiber becomes greater. Based on this loss of light, whether there is a collision is judged. The optical fiber is attached to a resin retaining plate.

On the other hand, the present applicant has proposed a load sensor having an elastomeric sensor thin film (for example, see Patent Documents 2 and 3). In a load sensor disclosed in Patent Document 2, a sensor thin film is formed in which conductive filler is filled in elastomer of a parent material at a predetermined state. According to this load sensor, based on a change in electrical resistance caused when the sensor thin film elastically deforms, an input load can be detected. A load sensor disclosed in Patent Document 3 is a capacitance-type sensor, which includes an elastomeric dielectric film and a pair of electrodes arranged sandwiching the dielectric film. According to this load sensor, based on a change in capacitance between the pair of electrodes, an input load can be detected.

RELATED ART

Patent Document

Patent Document 1: Japanese Patent Laid-Open Publication No. 2007-153073
Patent Document 2: Japanese Patent Laid-Open Publication No. 2008-107199
Patent Document 3: Japanese Patent Laid-Open Publication No. 2009-20006
Patent Document 4: Japanese Patent Laid-Open Publication No. 2008-175659

SUMMARY OF THE INVENTION

Problems to be Solved by the Invention

A load sensor is required to have durability according to a usage environment. For example, when used in a vehicle, a load sensor is required to have heat and humidity resistance, chemical resistance, weather resistance, and the like. In this regard, components of the load sensors of the above Patent Documents 2 and 3 are mainly made from polymer material such as elastomer. Therefore, for example, in a hot and humid environment, a sensor thin film, a base material, and the like may hydrolyze and deteriorate. Further, silver in a wiring may cause migration. When the migration is left untreated, dendrites of precipitated silver may cause short circuits between adjacent wirings. In order to inhibit such deterioration and flaws in a sensor component, for example, a load sensor can be used in a state housed in a resin case. However, even when a load sensor is covered with a resin case, influence of moisture and oxygen with respect to a component cannot be completely eliminated.

The present invention is devised in view of such circumstances. A purpose of the present invention is to provide a sensor assembly and a sensor module having a flexible sensor element that uses polymer material and having a component such as the sensor element or the like that is less likely to deteriorate and is superior in durability.

Means for Solving the Problems (1) A sensor assembly according to the present invention includes a sensor element; and an exterior packaging bag enclosing the sensor element. The sensor element includes a sensor thin film made of resin or elastomer; and at least one pair of electrodes connected to the sensor thin film. The exterior packaging bag is formed from a laminate film having a metal foil and two resin layers arranged sandwiching the metal foil.

In the sensor assembly of the present invention, the sensor element is enclosed inside the exterior packaging bag. The exterior packaging bag is formed from the laminate film having a metal foil and two resin layers. The laminate film is hard for oxygen and moisture to pass through. Therefore, contact between the sensor element, and oxygen and moisture is inhibited. For this reason, the sensor element hardly deteriorates. That is, for example, even when the sensor assembly of the present invention is arranged in a hot and humid environment, the sensor thin film and the like are less likely to hydrolyze. Further, silver in the wiring is also less likely to cause migration. Therefore, the sensor assembly of the present invention is superior in durability and ensures a long life. Further, contact between the sensor element, and oxygen and moisture is inhibited. Therefore, the level of humidity resistance or the like that is required for a sensor material can be lowered. This allows material cost to be reduced. In the present specification, "elastomer" includes rubber and thermoplastic elastomer.

The laminate film is thin and flexible and has a high degree of freedom with respect to its shape. Therefore, by forming the exterior packaging bag from the laminate film, regardless of the size and the shape such as a sheet-like shape and a belt-like shape of the sensor element, the sensor element can be housed in the exterior packaging bag. Further, the sensor assembly can be made thinner and more light weighted. Further, the sensor element can be covered along the shape of the outer edge of the sensor element. For this reason, a void is unlikely to occur between the exterior packaging bag and the sensor element.

In the laminate film, the metal foil is interposed between the two resin layers. The metal foil is conductive. Therefore, by grounding the metal foil, electromagnetic waves generated by the sensor element can be allowed to escape. This allows noise in an electrical circuit to be reduced. Further, by suitably selecting the type of the resin layer according to a usage environment, features such as chemical resistance, heat resistance, weather resistance, strength and the like can be imparted to the laminate film.

(2) It is desirable that, in the configuration of the above aspect (1), of the two resin layers, an inner resin layer arranged on an inner side have a melting point lower than that of an outer resin layer arranged on an outer side.

Sealing of the exterior packaging bag is performed by fusion bonding an overlapping portion of the laminate film using heat or ultrasound. The inner adhesion layer is melt by heat or ultrasound, and plays a role of bonding the overlapping portion. For this reason, it is desirable that the inner adhesion layer be configured with resin of a relatively low melting point. According to the present configuration, the inner adhesion layer is easy to be fusion-bonded. Therefore, the laminate film can be easily sealed.

Depending on the type of the outer resin layer, as the resin of the inner resin layer, for example, at least one kind selected from polyphenylene sulfide, polyethylene terephthalate, polyethylene naphthalate, polyethylene, polypropylene, acid-modified polyolefin, polyamide, polycarbonate, polyoxymethylene, polymethylmethacrylate, polyvinyl chloride resin, fluorine resin, and ethylene-vinyl alcohol copolymer resin can be used. For the reason of having a lower melting point, polypropylene, polyethylene, and acid-modified polyolefin are preferable.

Further, it is desirable that the inner resin layer have a thickness of 5 μm or more and 200 μm or less. When the thickness is less than 5 μm, peeling strength (sealing property) may deteriorate. It is preferred that the thickness be 20 μm or more. On the other hand, when the thickness is above 200 μm, the film thickness of the laminate film increases. Therefore, sensor sensitivity may deteriorate. It is preferred that the thickness be 100 μm or less.

(3) It is desirable that, in the configuration of the above aspect (2), the outer resin layer be made from at least one kind selected from polyphenylene sulfide, polyethylene terephthalate, polyethylene naphthalate, polyethylene, polypropylene, polyamide, polycarbonate, polyoxymethylene, polymethylmethacrylate, polyvinyl chloride resin, fluorine resin, and ethylene-vinyl alcohol copolymer resin.

As the resin of the outer resin layer, a resin, having features such as heat and humidity resistance, heat resistance, chemical resistance, weather resistance, strength, and the like, can be suitably selected according to a usage environment. According to the present configuration, a laminate film (exterior packaging bag) superior particularly in heat and humidity resistance, heat resistance, and chemical resistance can be obtained. Of the above-mentioned materials, for the reason of having high heat resistance and heat and humidity resistance, polyphenylene sulfide, polyethylene terephthalate and polyethylene naphthalate are preferable.

Further, it is desirable that the outer resin layer have a thickness of 5 μm or more and 100 μm or less. When the thickness is less than 5 μm, strength of the laminate film may deteriorate. It is preferred that the thickness be 10 μm or more. On the other hand, when the thickness is above 100 μm, the film thickness of the laminate film increases. Therefore, sensor sensitivity may deteriorate. It is preferred that the thickness be 50 μm or less.

(4) It is desirable that, in the configuration of the above aspect (1), the metal foil be made from at least one kind selected from aluminum, tin, copper, stainless steel, and zinc.

The metal foil plays a role of inhibiting penetration of oxygen, moisture, and the like. Further, the metal foil is conductive, and therefore, as described above, can be used for noise reduction. From the point view of conductivity, it is desirable that the metal foil have a volume resistivity of $10^{-3}$ Ω·cm or less. According to the present configuration, the effect of inhibiting penetration of oxygen, moisture, and the like can be improved. Of the above-mentioned metals, aluminum is light in weight, has good stretchability, and is less expensive, and thus is preferred.

Further, it is desirable that the metal foil have a thickness of 0.1 μm or more and 80 μm or less. When the thickness is less than 0.1 μm, the effect to inhibit water penetration may deteriorate. It is preferred that the thickness be 1 μm or more. On the other hand, when the thickness is above 80 μm, the film thickness of the laminate film increases. Therefore, sensor sensitivity may deteriorate. It is preferred that the thickness be 50 μm or less.

(5) It is desirable that, in the configuration of the above aspect (1), a film member be interposed between the exterior packaging bag and the sensor element, the film member having a friction coefficient smaller than that of at least one of an inner surface of the exterior packaging bag and an outermost surface of the sensor element.

For example, when the sensor assembly of the present invention is depressed, the sensor element deforms. The load applied during the depression is detected based on the deformation of the sensor element. In this case, when the exterior packaging bag and the sensor element are firmly attached to each other, the deformation of the sensor element is inhibited by the exterior packaging bag. For this reason, the load cannot be accurately detected. Therefore, it is desirable that the exterior packaging bag do not inhibit the deformation of the sensor element. That is, it is desirable that the friction between the exterior packaging bag and the sensor element be as small as possible. According to the present configuration, the film member, having a friction coefficient smaller than that of at least one of the inner surface of the exterior packaging bag and the outermost surface of the sensor element, is interposed between the exterior packaging bag and the sensor element. Here, the outermost surface of the sensor element is the surface in contact with the exterior packaging bag in the case where the film member is absent. Therefore, the sensor element becomes slick inside the exterior packaging bag, and thus can easily deform. This allows a load to be accurately detected. In the present configuration, the friction coefficients may be compared using static friction coefficients.

As the film member, for example, polyoxymethylene, and fluorine resin such as polytetrafluoroethylene and tetrafluoroethylene-ethylene copolymer, are preferred.

(6) It is desirable that, in the configuration of the above aspect (1), the sensor thin film be formed in which a conductive filler is filled in a resin or elastomeric parent material; and the sensor element further include an insulating base material arranged on a surface of the sensor thin film, and is capable of detecting an input load based on a change in electrical resistance due to deformation of the sensor thin film.

With respect to the deformation of the sensor thin film, the electrical resistance may increase or decrease. The change behavior of the electrical resistance with respect to the deformation of the sensor thin film can be adjusted by adjusting the type of the elastomer of the parent material, the type of the conductive filler, the amount of the conductive filler, and the like.

For example, it is preferable that spherical conductive filler is filled in the parent material in a nearly single-particle state and at a high filling rate. Here, the "nearly single-particle state" means that, when the total weight of the conductive filler is 100% by weight, 50% or more by weight of the particles of the conductive filler exist in an independent primary particle state rather than as agglomerated secondary particles. The "high filling rate" means that the conductive filler is filled in a nearly close-packed state. By doing so, in a state in which a load is not input (which may be referred to as a "no-load" state" in the following), three-dimensional conductive paths can be formed in the parent material via contact among the particles of the conductive filler. Therefore, in the no-load state, the sensor thin film is highly conductive. For example, when the sensor thin film deforms, the contact state among the particles of the conductive filler changes. This causes the three-dimensional conductive paths to collapse and the electrical resistance to increase. As the deformation amount increases, the electrical resistance increases.

(7) It is desirable that, in the configuration of the above aspect (6), the sensor element further include an elastic plate, which is arranged on the sensor thin film side or the base material side, and which elastically deforms due to an input load, thereby causing the sensor thin film to undergo a bending deformation; and the sensor element be capable of detecting the input load based on a change in electrical resistance due to the bending deformation of the sensor thin film.

In the sensor thin film, various stresses such as compression and tension are applied depending on the input form of the load. However, the change behavior of the electrical resistance of the sensor thin film is different depending on the type of the stress. For example, in the case where the electrical resistance increases with respect to the deformation of the sensor thin film, the increase behavior of the electrical resistance with respect to compression and the increase behavior of the electrical resistance with respect to tension are different. Therefore, in the case where a compressive stress and a tensile stress are mixed, the electrical resistance is unlikely to linearly change with respect to the size of the load. For this reason, it is difficult to accurately detect the load.

In this regard, according to the present configuration, the elastic plate is arranged on the sensor thin film side or the base material side. When a load is applied, the elastic plate is compressed and elastically deforms in a manner deflecting toward the load input direction. Along with the deformation of the elastic plate, the sensor thin film undergoes bending deformation. That is, the energy of the input load is used on bending the sensor thin film. Therefore, according to the present configuration, change in the electrical resistance with respect to the bending deformation of the sensor thin film is output. This allows the load to be accurately detected regardless of the input form of the load.

Further, the spring constant of the elastic plate varies depending on the material, shape (area, thickness), and the like. Therefore, elastic deformation amount (deflection amount) with respect to a load can be adjusted by the material, shape, and the like of the elastic plate. This allows the value of the electrical resistance with respect to the bending deformation amount of the sensor thin film to be set within a desired range. Further, due to a restoring force of the elastic plate, reproducibility of a response with respect to the load is high. Further, impact of the input load is absorbed by the elastic plate. For this reason, damage to the sensor element is reduced.

(8) It is desirable that, in the configuration of the above aspect (6) or aspect (7), the sensor element further include a load transmitting plate arranged more on a load input side than the sensor thin film; the load transmitting plate have a plurality of convex portions having curved surface shapes; and the input load be transmitted to the sensor thin film via the plurality of convex portions.

According to the present configuration, an input load is transmitted to the sensor thin film via the load transmitting plate. That is, the input load is divided by the plurality of convex portions to be transmitted to the sensor thin film. The convex portions are formed in a curved surface shape of a predetermined curvature. For this reason, regardless of the shape of a colliding object that inputs the load, the load is input to the sensor thin film at a predetermined curvature. That is, when a load is input to the sensor thin film, the shape of the colliding object is hardly reflected. Therefore, according to the present configuration, the load can be accurately detected without depending on the shape of the colliding object.

(9) It is desirable that, in the configuration of the above aspect (1), the sensor thin film be formed in which a conductive filler is filled at a filing rate of 30% or more by volume in a resin parent material; three-dimensional conductive paths be formed in the sensor thin film via contact among the particles of the conductive filler; and the sensor element further include an insulating base material arranged on a surface of the sensor thin film, and be capable of detecting deformation of a measured object based on an increase in electrical resistance with respect to bending deformation of the sensor thin film.

In the present configuration, the sensor thin film is formed in which conductive filler is filled at a high filling rate in a resin parent material. The filling rate of the conductive filler is a value when the volume of the sensor thin film is 100% by volume. The filling rate of the conductive filler is high. Therefore, in the sensor thin film in the no-load state, three-dimensional conductive paths are formed via contact among the particles of the conductive filler. Therefore, in the no-load state, the sensor thin film is highly conductive.

FIGS. 17(a)-17(c) illustrate enlarged schematic views near a portion of the conductive filler in the sensor thin film. Here, FIGS. 17(a)-17(c) are schematic views for explaining the sensor thin film. Therefore, FIGS. 17(a)-17(c), including the shape of the particles of the conductive filler, the shape of the conductive paths, the extension direction of the conductive paths, and the like, are not to be considered as limiting in any way the configuration of the sensor thin film. FIGS. 17(a)-17(c) respectively illustrate a no-load state before a bending deformation, a state immediately after the bending deformation, and a state further after the state immediately after the bending deformation. As FIG. 17(a) illustrates, the sensor thin film 800 has matrix resin 801 and conductive filler particles 802. In the sensor thin film 800, a conductive path P is formed by contact among conductive filler particles 802. When a load is applied to the sensor thin film 800, the sensor thin film 800 starts a bending deformation. As FIG. 17(b) illustrates, along with the start of the bending deformation, the matrix resin 801 is stretched in the left-right direction in the drawing. This causes the conductive filler particles 802 to repel each other and the contact state of the conductive filler particles 802 to change. As FIG. 17(c) illustrates, as the sensor thin film 800 bends further, the matrix resin 801 is stretched further. This causes the contact among the conductive filler particles 802 to be broken and the conductive path P to be cut off. As a result, the electrical resistance increases. When the applied load is removed, the sensor thin film 800 restores its original state (the state illustrated in FIG. 17(a)) by an elastic restoring force of the matrix resin 801.

As described above, in the sensor thin film of the present configuration, the electrical resistance increases as the bending deformation amount increases. This allows the sensor element of the present configuration to detect deformation of a measured object. Further, the sensor thin film is arranged on the surface of the base material. By adjusting the thickness of the base material, sensitivity of the sensor element can be adjusted. For example, in a case where the center of curvature during a bending deformation is on the rear side of the base material, when the thickness of the base material is increased, a strain amount of the sensor thin film during the bending deformation increases. That is, when a total thickness of the base material and the sensor thin film is denoted by t, and a radius of curvature extending from the center of curvature to the rear surface of the base material during a bending deformation is denoted by R, the strain amount $\in$ is given by $\in = t/R$. For this reason, when the thickness of the base material is increased, the strain amount of the sensor thin film during a bending deformation increases. This improves the sensitivity of the sensor element.

(10) It is desirable that, in the configuration of the above aspect (9), the sensor element further include an elastically deformable cover film arranged in a manner covering the sensor thin film; and cracks be formed in advance in the sensor thin film in such a direction that the conductive paths are cut off when a bending deformation occurs.

In the configuration of the above aspect (9), when the sensor thin film undergoes a bending deformation, the elastic deformation of the parent material causes the conductive paths to collapse and the electrical resistance of the sensor thin film to increase. That is, the sensor element uses the increase in the electrical resistance in the elastic region of the parent material of the sensor thin film to detect the deformation of a measured object. However, it takes time from an input of a strain until the parent material elastically deforms. For this reason, in detecting a deformation in the elastic region of the parent material, the response is delayed by the time required for the elastic deformation of the parent material. Therefore, detection accuracy decreases. In particular, for a fast bending deformation, the response delay further increases and thus the detection accuracy is likely to further decrease. Further, the speed of the elastic deformation of the parent material is influenced by the input speed of a strain and the atmospheric temperature. For this reason, the input speed of the strain and the atmospheric temperature also contribute to the decrease in the detection accuracy.

According to the present configuration, cracks are formed in advance in the sensor thin film. The cracks are formed in such a direction that the conductive paths are cut off when a bending deformation occurs. FIGS. 18(a) and 18(b) illustrate enlarged schematic views near a portion of a crack in the sensor thin film. Here, FIGS. 18(a) and 18(b) are schematic views for explaining the sensor thin film. Therefore, FIGS. 18(a) and 18(b), including the shape of the crack, the extension direction of the crack, the shape of the particles of the conductive filler, the shape of the conductive path, the extension direction of the conductive path, and the like, are not to be considered as limiting in any way the configuration of the sensor thin film. FIGS. 18(a) and 18(b) respectively illustrate a no-load state before a bending deformation and a state after the bending deformation.

As FIG. 18(a) illustrates, the sensor thin film 800 has matrix resin 801, conductive filler particles 802, and a crack 803. In the sensor thin film 800, a conductive path P is formed by contact among conductive filler particles 802. The crack 803 is formed along a direction crossing the left-right direction (extension direction) in the figure. When a load is applied to the sensor thin film 800, the sensor thin film 800 starts a bending deformation. When the sensor thin film 800 is stretched in the left-right direction due to the bending deformation, as FIG. 18(b) illustrates, the crack 803 opens up. This causes the contact among the conductive filler particles 802 to be broken and the conductive path P to be cut off. As a result, the electrical resistance increases. When the applied load is removed, the sensor thin film 800 restores its original state (the state illustrated in FIG. 18(a)). This also causes the crack 803 to return to its original state.

As described above, according to the sensor thin film of the present configuration, when a strain is input due to a bending deformation, the conductive paths are cut off without waiting for an elastic deformation of the matrix resin (however, the case where the conductive paths are cut off due to an elastic deformation of the matrix resin is not excluded). Therefore, a response delay is unlikely to occur.

Further, the conductive paths are cut off primarily due to the opening up of the cracks. Therefore, as compared to the case where the cutting off of the conductive paths depends only the elastic deformation of the matrix resin (see above-mentioned FIGS. 17(a)-17(c)), even a small strain can be accurately detected.

Further, as described above, the speed of an elastic deformation of the matrix resin is influenced by the atmospheric temperature. With respect to this point, the conductive paths in the sensor thin film of the present configuration are cut off primarily due to the opening up of the cracks. For this reason, as compared to the case where the conductive paths are cut off depending only on the elastic deformation of the matrix resin (see the above-mentioned FIGS. 17(a)-17(c)), the response speed is less dependent on the atmospheric temperature. The response speed is also less dependent on the input speed of a strain.

Further, the sensor thin film is covered by the cover film. This inhibits deterioration of the sensor thin film. Here, the cover film is elastically deformable. Therefore, when the load is removed after the bending deformation, with the help of the elastic restoring force of the cover film, the sensor thin film easily restores its original shape. The opened up cracks also easily restore their original state.

(11) It is desirable that, in the configuration of the above aspect (1), the sensor thin film be made from elastomer; the pair of electrodes be arranged across the sensor thin film; and the sensor element be capable of detecting an input load based on a change in capacitance between the pair of electrodes.

Generally, the capacitance of a capacitance-type sensor formed by interposing a dielectric film between a pair of electrodes can be obtained according to the following equation (I).

$$C = \in_0 \in_r S/d \qquad (I)$$

[where C is the capacitance; $\in_0$ is the vacuum permittivity; $\in_r$ is the relative permittivity of the dielectric film; S is the electrode area; and d is the distance between the electrodes]

In the present configuration, when the sensor element is depressed, the sensor thin film (dielectric film) is compressed and stretched in a direction parallel to the surfaces of the electrodes. According to the above equation (I), when the thickness of the sensor thin film, that is, the distance d between the electrodes, decreases, the capacitance C between the electrodes increases. According to the present configuration, based on this change in the capacitance, the input load can be detected.

(12) A sensor module according to the present invention includes the sensor assembly according to any one of the above aspects (1)-(11); and a circuit case on which the sensor assembly is installed. The exterior packaging bag of the sensor assembly has an opening. The sensor element has a wiring unit projecting out of the exterior packaging bag from the opening. The circuit case has a box-like shape, and includes a case body on which an assembly mounting opening is provided; a packing member sealing the opening in a state in which the wiring unit projects out from the opening of the exterior packaging bag and being installed on the assembly mounting opening of the case body; and a connector being connected to the wiring unit inside the case body and being connected to an electrical circuit.

The sensor element has the wiring unit connected to the electrical circuit. The wiring unit is led out from the opening of the exterior packaging bag and is connected to the electrical circuit. According to the present configuration, the wiring unit is housed inside the case body of the circuit case. For this reason, the wiring unit can be protected from an impact and the like. By using the packing member, the opening of the exterior packaging bag can be easily sealed and the sensor assembly can be installed on the circuit case.

DESCRIPTION OF REFERENCE NUMERALS

Figure 1:
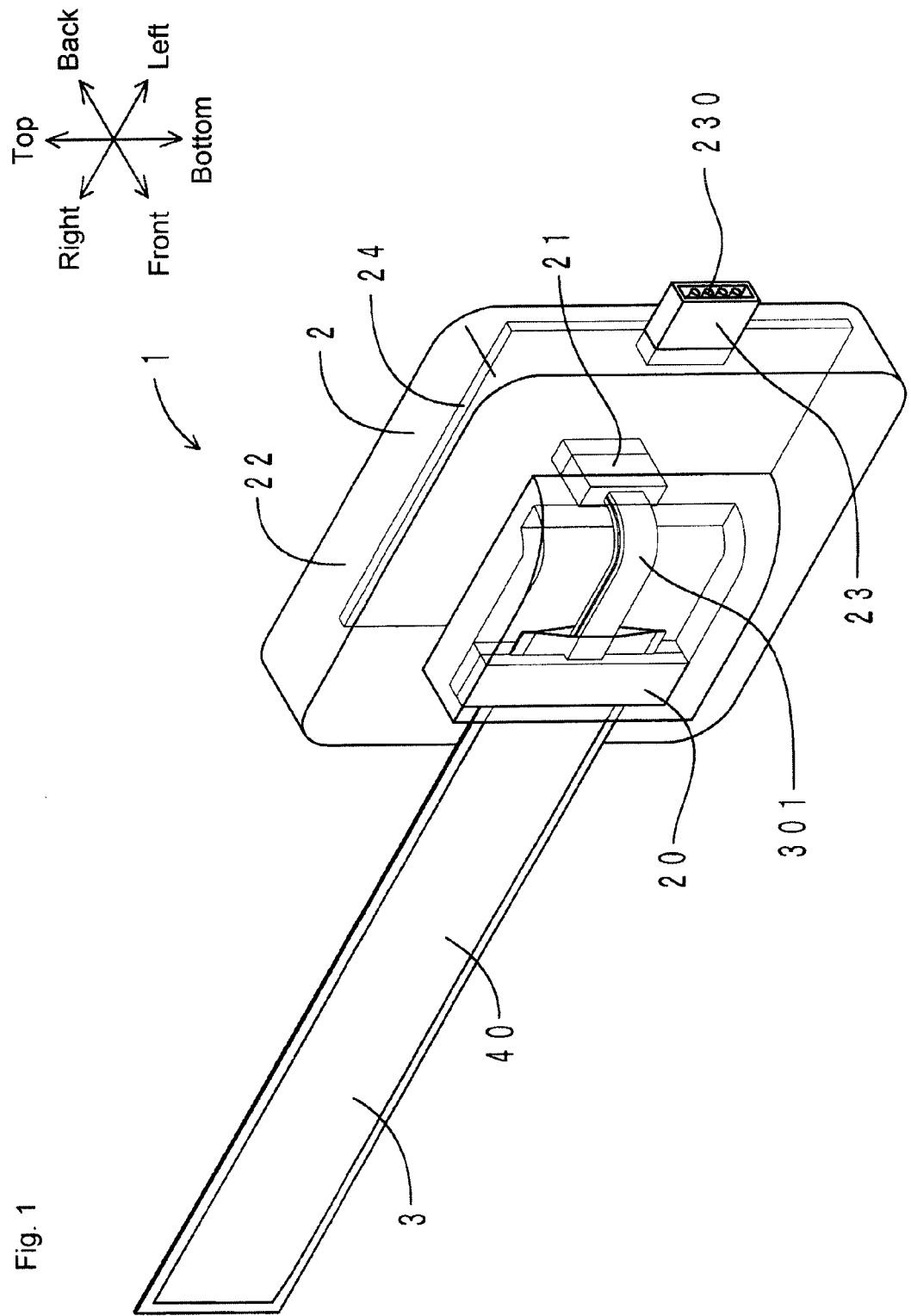
FIG. 1 is a perspective view of a sensor module according to a first embodiment.

1: sensor module
2: circuit case
20: packing member
20a: front side securing member
20b: rear side securing member
21: connector
22: case body
23: external connection connector
24: circuit substrate (electrical circuit)
200a, 201a: recess
200b, 201b: projection
220: assembly mounting opening
230: terminal
3: sensor assembly
30: sensor element
31: constraining plate (base material)
32: sensor thin film
33R, 33L: electrode
34R, 34L: wiring
35: insulation film (base material)
36: cover film
37: elastic plate
38: load transmitting plate
300: body unit
301: wiring unit
380: convex portion
40: exterior packaging bag
41, 42: laminate film
410: outer resin layer
411: metal foil
412: inner resin layer
50: sensor element
51: sensor thin film
52a, 52b: electrode
53a, 53b: wiring
54a, 54b: cover film
500: body unit
501: wiring unit
60a, 60b: insulation plate (film member)
61a, 61b: film member
70: sensor element
71: base material
72: sensor thin film
73a-73i: electrode
74a-74i: wiring
75: cover film
76: mold
700: body unit
701: wiring unit
701: front
720: coated film
760: inner periphery
800: sensor thin film
801: matrix resin
802: conductive filler particles
803: crack
C1: crack
P: conductive path
U1: unit section

MODE FOR CARRYING OUT THE INVENTION

Next, embodiments of a sensor assembly and a sensor module of the present invention are explained.

First Embodiment

Figure 2:
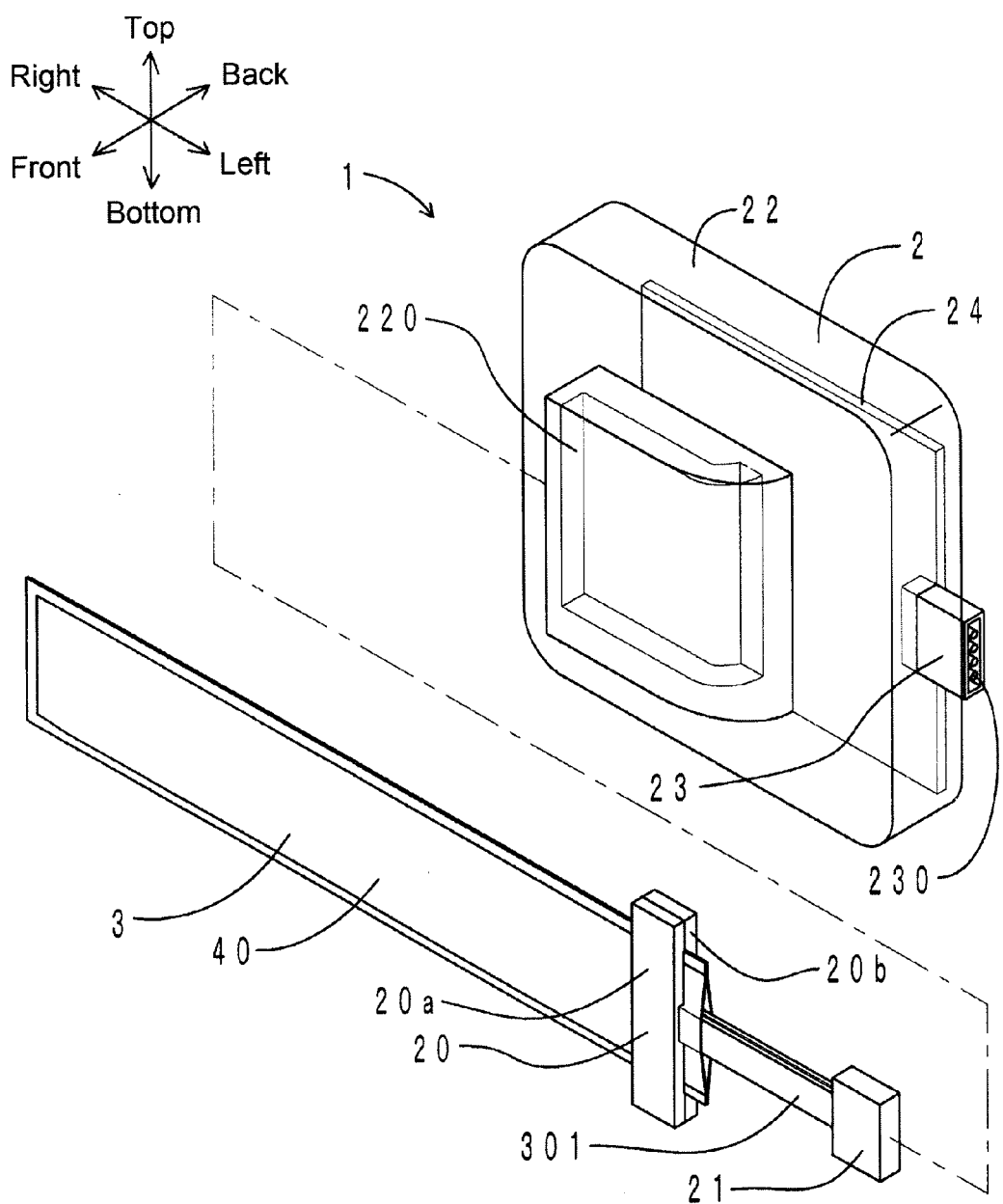
FIG. 2 is an exploded perspective view of the sensor module.
Figure 3:
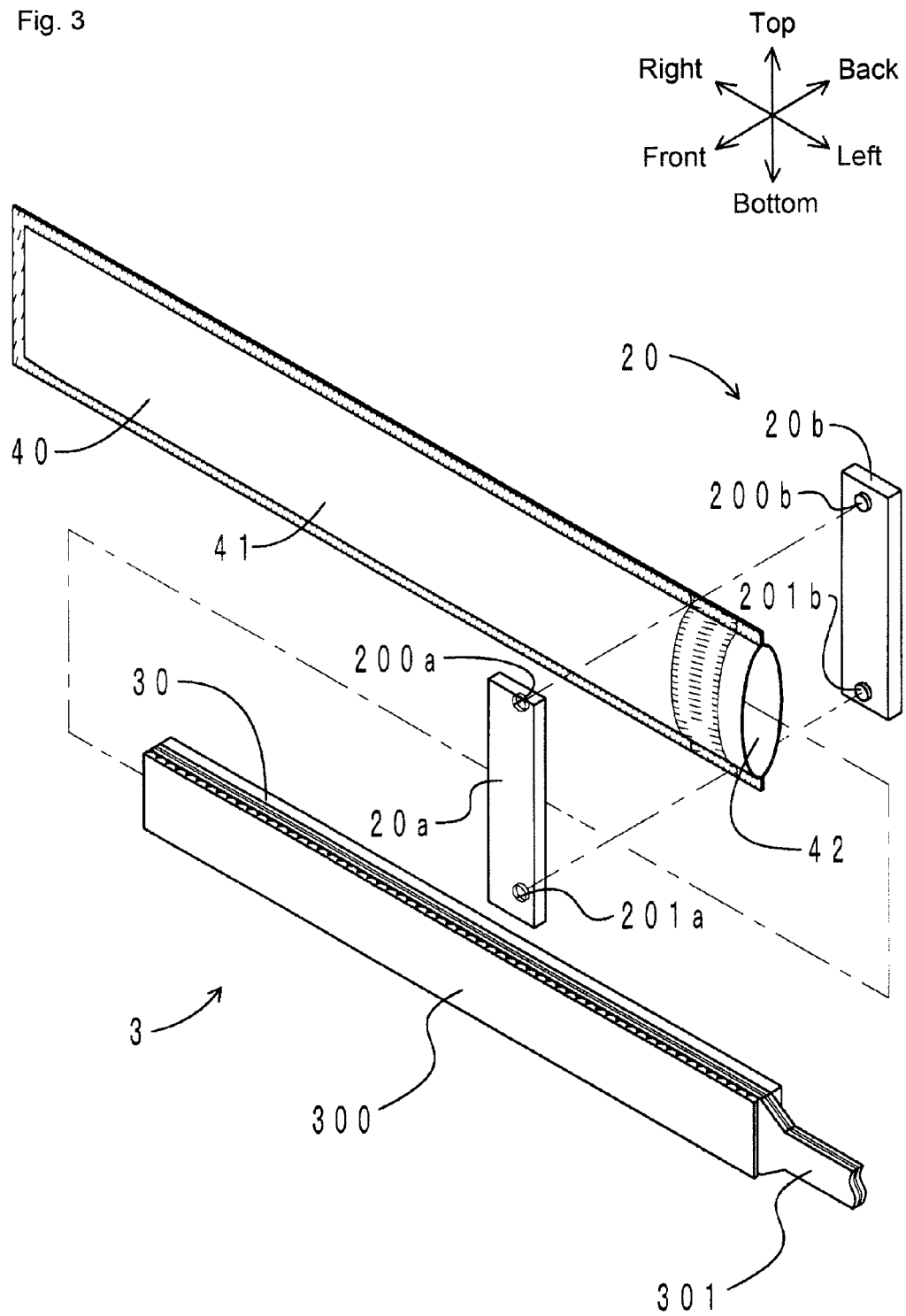
FIG. 3 is an exploded perspective view of a sensor assembly in the sensor module.

[Sensor Module Configuration]
First, a configuration of a sensor module according to the present embodiment is explained. FIG. 1 illustrates a perspective view of the sensor module according to the present embodiment. FIG. 2 illustrates an exploded perspective view of the sensor module. FIG. 3 illustrates an exploded perspective view of a sensor assembly in the sensor module. In FIGS. 1-3, transparently visible portions are illustrated using thin lines.

As FIGS. 1-3 illustrate, a sensor module 1 includes a circuit case 2 and a sensor assembly 3. The sensor module 1 is installed on a surface (front surface) of a front bumper of a vehicle (not shown in the drawings). Therefore, directions in the drawings are defined relative to a traveling direction of the vehicle. In the present embodiment, a load is input to the sensor assembly 3 from the front.

The circuit case 2 includes a case body 22, a packing member 20, a connector 21, an external connection connector 23, and a circuit substrate 24. The case body 22 is made of resin, and has a box-like shape. As FIG. 2 illustrates, on the front surface of the case body 22, an assembly mounting opening 220 is provided opening toward the right. The assembly mounting opening 220 is in communication with inside and outside of the case body 22.

The packing member 20 is made of resin. The packing member 20 has a front side securing member 20a and a rear side securing member 20b. The front side securing member 20a has a rectangular plate-like shape. On two ends in the up-down direction on the rear surface of the front side securing member 20a, a pair of recesses 200a and 201a are formed. Similarly, the rear side securing member 20b has a rectangular plate-like shape. On two ends in the up-down direction on the front surface of the rear side securing member 20b, a pair of projections 200b and 201b are formed. The front side securing member 20a and the rear side securing member 20b are bonded by respectively fitting the projections 200b and 201b to the recesses 200a and 201a. Between the front side securing member 20a and the rear side securing member 20b, a left end portion (portion illustrated by hatching in FIG. 3) of the sensor assembly 3 is sandwiched. In the state in which the left end portion of the sensor assembly 3 is sandwiched, the packing member 20 is pressed into the assembly mounting opening 220 to be fixed. A wiring unit 301 of the sensor assembly 3 is housed inside the case body 22 via the assembly mounting opening 220.

The circuit substrate 24 is housed inside the case body 22. The circuit substrate 24 is arranged in contact with a back wall of the case body 22. The connector 21 connects to the circuit substrate 24. Further, the connector 21 connects to the wiring unit 301 of the sensor assembly 3 inside the case body 22. The external connection connector 23 is penetratingly provided on a left wall of the case body 22. The external connection connector 23 has a terminal 230. The external connection connector 23 connects to the circuit substrate 24 inside the case body 22. Further, the external connection connector 23 connects to an occupant protection ECU (electronic control unit, not shown in the drawings) arranged outside the case body 22. That is, the wiring unit 301 of the sensor assembly 3 connects to the occupant protection ECU on the outside via the connector 21, the circuit substrate 24, and the external connection connector 23. In the following, the sensor assembly 3 is explained in detail.

[Sensor Assembly Configuration]

As the above-mentioned FIG. 3 illustrates, the sensor assembly 3 includes a sensor element 30 and an exterior packaging bag 40. The sensor element 30 has a body unit 300 and the wiring unit 301. The body unit 300 has a sensor thin film 32, which will be described later. The body unit 300 detects a load. The body unit 300 is enclosed inside the exterior packaging bag 40. The wiring unit 301 has wirings 34R and 34L, which will be described later. The wiring unit 301 projects out from the exterior packaging bag 40 toward the left side.

Figure 4:
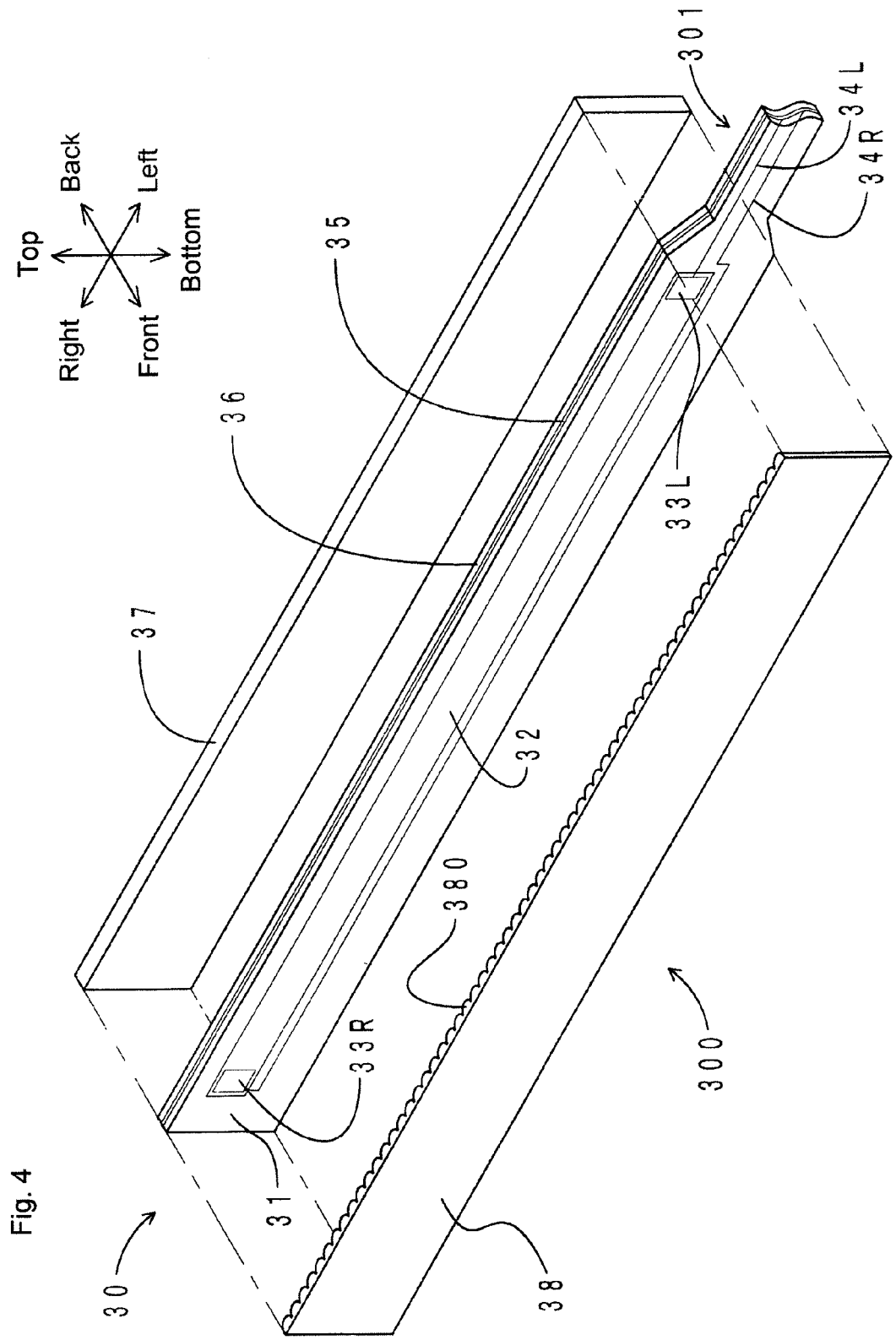
FIG. 4 is an exploded perspective view of a sensor element in the sensor assembly.
Figure 5:
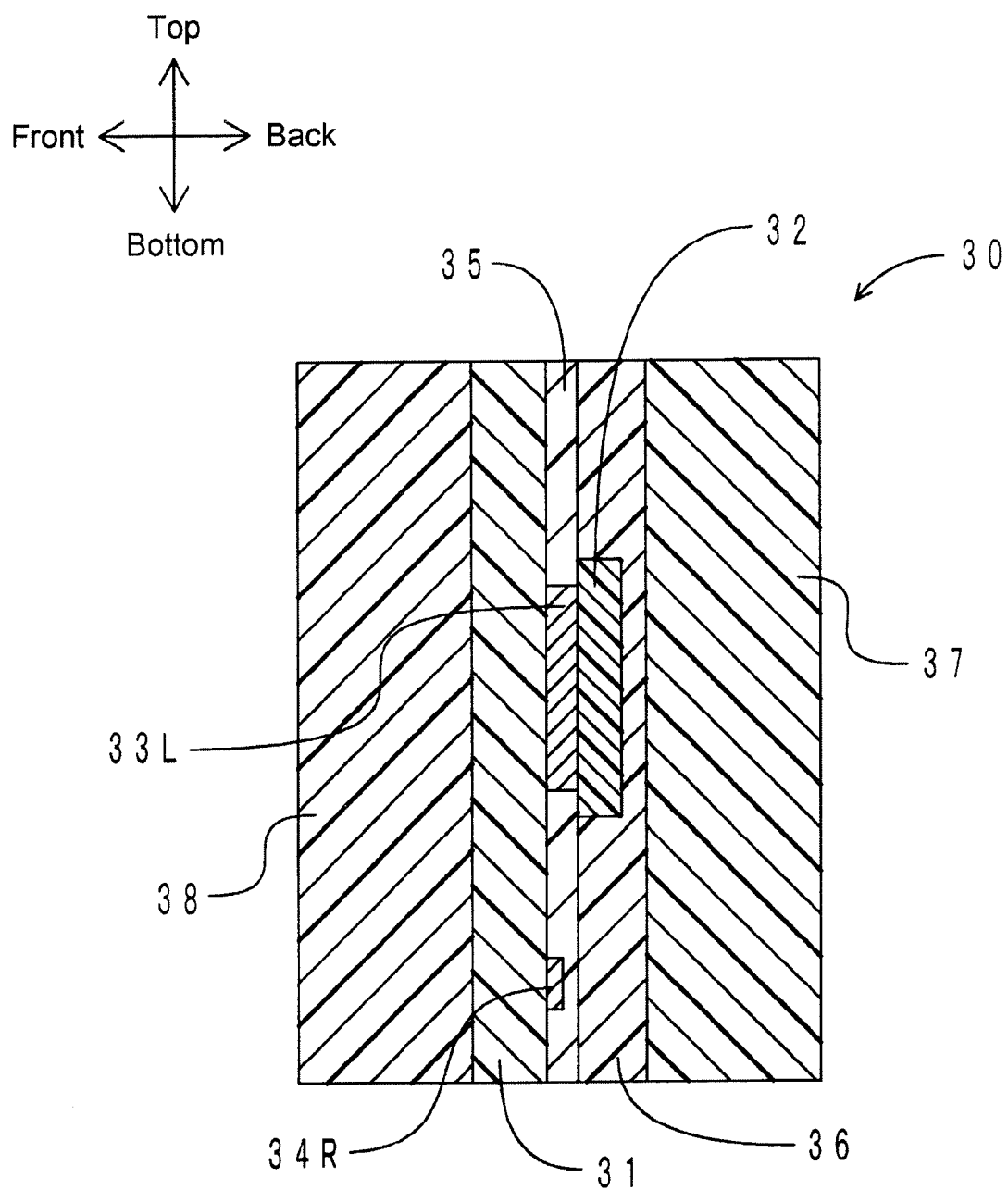
FIG. 5 is a cross-section view in a transverse direction in FIG. 4 near an electrode on a left side.

FIG. 4 illustrates an exploded perspective view of the sensor element. FIG. 5 illustrates a cross-section view in a transverse direction in FIG. 4 near an electrode on the left side. In FIG. 4, for the convenience of explanation, a constraining plate and an insulation film are transparently illustrated. In FIG. 4, transparently visible portions are illustrated using thin lines. As FIGS. 4 and 5 illustrate, the body unit 300 of the sensor element 30 includes a constraining plate 31, the sensor thin film 32, electrodes 33R and 33L, the wirings 34R and 34L, an insulation film 35, a cover film 36, an elastic plate 37, and a load transmitting plate 38. The sensor thin film 32, the electrodes 33R and 33L, the wirings 34R and 34L, the insulation film 35, and the cover film 36 are all formed on the rear side of the constraining plate 31 by using a screen printing method.

The constraining plate 31 is made of polyethylene terephthalate (PET), and has a belt-like shape extending in the left-right direction.

The electrodes 33R and 33L have a square shape, and are formed on the rear surface of the constraining plate 31. The electrodes 33R and 33L are interposed between the constraining plate 31 and the sensor thin film 32. The electrode 33R is arranged on the right end of the sensor thin film 32, and the electrode 33L is arranged on the left end of the sensor thin film 32. The wirings 34R and 34L are formed on the rear surface of the constraining plate 31. The wiring 34R is connected to the electrode 33R, and the wiring 34L is connected to the electrode 33L. The electrodes 33R and 33L and the wirings 34R and 34L are all formed from silver paste.

The insulation film 35 is made of acrylic resin, and has a belt-like shape extending in the left-right direction. The insulation film 35 covers the rear surface of the constraining plate 31 in a state excluding the electrodes 33R and 33L. The constraining plate 31 and the insulation film 35 are included in a base material in the present invention.

The sensor thin film 32 has a belt-like shape extending in the left-right direction. The sensor thin film 32 has a film thickness of about 250 μm. The sensor thin film 32 is arranged on the rear surface of the constraining plate 31, more specifically, on the rear surface of the electrodes 33R and 33L and the insulation film 35. The sensor thin film 32 is formed in which carbon beads (conductive filler) are filled in epoxy resin. The filling rate of the carbon beads is about 45% by volume when the volume of the sensor thin film 32 is 100% by volume.

The cover film 36 is made of acrylic rubber, and has a belt-like shape extending in the left-right direction. The cover film 36 covers the rear surfaces of the insulation film 35 and the sensor thin film 32.

The elastic plate 37 is made of acrylic rubber, and has a flat plate-like shape extending in the left-right direction. The elastic plate 37 has a thickness of about 3 mm. The elastic plate 37 has a width (length in the up-down direction) of about the same as that of the constraining plate 31. Further, the elastic plate 37 has a length (length in the left-right direction) of about the same as that of the body unit 300. The elastic plate 37 is arranged on the rear side of the constraining plate 31. The elastic plate 37 and the cover film 36 are bonded together.

The load transmitting plate 38 is made of an acrylonitrile-butadiene-styrene (ABS) resin, and has a flat plate-like shape extending in the left-right direction. The load transmitting plate 38 has dimensions of about the same as that of the elastic plate 37. The load transmitting plate 38 is arranged on the front surface of the constraining plate 31. The load transmitting plate 38 and the constraining plate 31 are bonded together. The load transmitting plate 38 has a planar front surface and a wave-shaped rear surface. That is, the rear surface is formed with a plurality of convex portions 380 each having a curved surface shape of a same curvature. The convex portions 380 and the constraining plate 31 are in line contact.

Returning to the above-mentioned FIG. 3, the exterior packaging bag 40 has a shape of a long bag extending in the left-right direction. The exterior packaging bag 40 is formed by bonding two sheets of laminate films 41 and 42. As illustrated in FIG. 3 by hatching, the three of top, bottom and right edges of the exterior packaging bag 40 are sealed by heat fusion bonding overlapping portions of the two sheets of laminate films 41 and 42. Further, as illustrated in FIG. 3 by hatching, the left edge of the exterior packaging bag 40 is sealed by the packing member 20. That is, the body unit 300 of the sensor element 30 is sealed inside the exterior packaging bag 40 by the packing member 20. Further, the wiring unit 301 of the sensor element 30 projects out from the exterior packaging bag 40.

Figure 6:
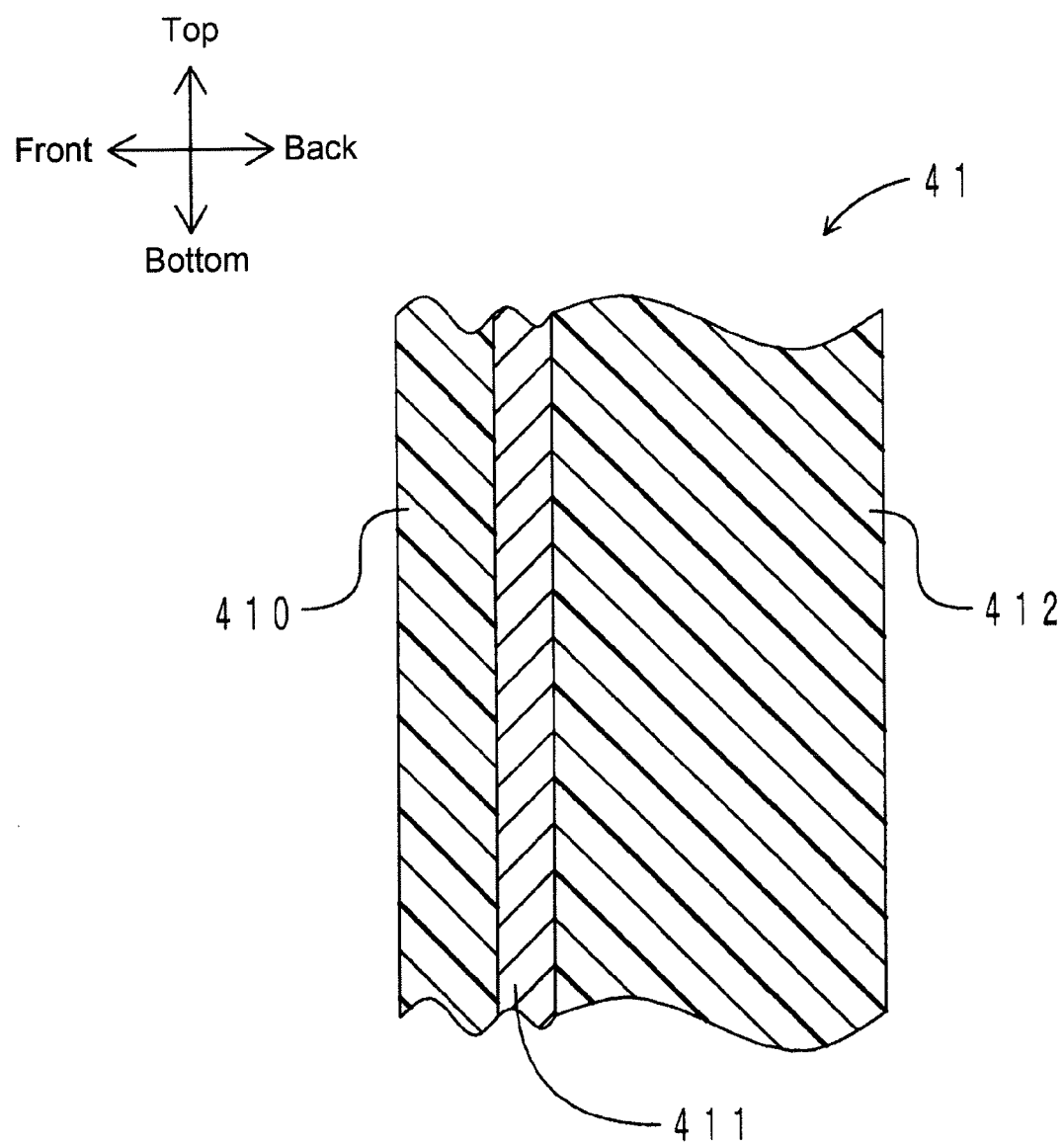
FIG. 6 is a cross-section view of a laminate film forming an exterior packaging bag.

The two sheets of laminate film 41 and 42 each have a three-layer structure of outer resin layer/metal foil/inner resin layer. The laminate film 41 and the laminate film 42 have the same configuration. Therefore, here, only the configuration of the laminate film 41 is explained. FIG. 6 illustrates a cross-section view of the laminate film 41.

As FIG. 6 illustrates, the laminate film 41 has an outer resin layer 410, a metal foil 411 and an inner resin layer 412. The outer resin layer 410 is made from polyethylene naphthalate (PEN) and forms the outermost layer of the exterior packaging bag 40. The outer resin layer 410 has a thickness of about 12 μm. The inner resin layer 412 is made from polypropylene (PP) and forms the innermost layer of the exterior packaging bag 40. The inner resin layer 412 has a thickness of about 40 μm. The metal foil 411 is made from aluminum (Al) and is interposed between the outer resin layer 410 and the inner resin layer 412. The metal foil 411 has a thickness of about 7 μm.

[Sensor Assembly Production Method]

Next, a production method of the sensor assembly 3 is explained. First, the exterior packaging bag 40 having one opening side is prepared by superimposing the two sheets of laminate films 41 and 42 and heat fusion bonding three surrounding edges. Next, the body unit 300 of the sensor element 30 is housed in the exterior packaging bag 40. The wiring unit 301 projects out from the exterior packaging bag 40. After that, the exterior packaging bag 40 is deaerated, and the opening of the exterior packaging bag 40 is sandwiched using the packing member 20 and sealed. As described above, the sensor assembly 3 is prepared.

[Sensor Module Production Method]

Next, a production method of the sensor module 1 is explained. First, the prepared sensor assembly 3 together with the packing member 20 are installed to the assembly mounting opening 220 of the case body 22 of the circuit case 2. In this case, the wiring unit 301 is inserted into the inside of the case body 22. Next, inside the case body 22, the wiring unit 301 is connected to the connector 21. Finally, the surrounding of the wiring unit 301 is secured using a sealant material.

[Operations of Sensor Assembly and Sensor Module]

Next, operations of the sensor assembly 3 and the sensor module 1 are explained. For example, when a colliding object (not shown in the drawings) collides against the front bumper of a vehicle, a load is applied from front to the sensor assembly 3, that is, to the sensor element 30. In this case, the load is divided by the convex portions 380 of the load transmitting plate 38, and is transmitted to the sensor element 30. That is, the constraining plate 31 and the sensor thin film 32 are depressed by the convex portions 380 of a certain curvature. Here, the film thickness of the sensor thin film 32 is small. For this reason, the sensor thin film 32 almost does not compressively deform. Further, deformation of the front surface of the sensor thin film 32 is restricted by the constraining plate 31. On the other hand, due to the input load, the elastic plate 37 compressively deforms in such a manner as to compress in the front-rear direction. Along with this, the sensor thin film 32 bends in such a manner as to deflect backward. When the sensor thin film 32 bends, the carbon beads filled in high density repel each other, causing the conductive paths to collapse. This causes the electrical resistance in the sensor thin film 32 between the electrodes 33R and 33L to increase significantly as compared to the electrical resistance in the no-load state. Data such as the electrical resistance, voltage, and the like of the sensor thin film 32 are sent via the wirings 34R and 34L, the connector 21, the circuit substrate 24 and the external connection connector 23 to the external occupant protection ECU, and are processed. As described above, the sensor module 1 detects an input load based on an increase in the electrical resistance of the sensor thin film 32.

[Operation Effect]

Next, the operation effect of the sensor assembly and the sensor module according to the present embodiment is explained. According to the sensor assembly 3 of the present embodiment, the body unit 300 of the sensor element 30 is enclosed inside the exterior packaging bag 40. The exterior packaging bag 40 is formed from the laminate films 41 and 42 having a PEN/Al/PP three-layer structure. The laminate films 41 and 42 are hard for oxygen and moisture to pass through. For this reason, the sensor thin film 32, the elastic plate 37, the load transmitting plate 38, and the like constituting the body unit 300 of the sensor element 30 are less likely to hydrolyze. Further, silver in the wirings 34R and 34L is also less likely to cause migration. Therefore, the sensor assembly 3 is superior in durability and ensures a long life.

Further, the wiring unit 301 of the sensor element 30 is housed inside the case body 22 of the circuit case 2. For this reason, the wiring unit 301 is unlikely to be damaged by an impact and the like. Further, the circuit case 2 is sealed. For this reason, deterioration of the wiring unit 301 is inhibited. Further, the opening of the exterior packaging bag 40 on the left edge is sealed by the packing member 20 inside the case body 22. This inhibits penetration of oxygen and moisture into the exterior packaging bag 40 via the opening. Thus, deterioration of the body unit 300 of the sensor element 30 is inhibited. Therefore, the sensor module 1 according to the present embodiment is superior in durability and ensures a long life.

Further, the exterior packaging bag 40 is formed from the laminate films 41 and 42. Therefore, the sensor assembly 3 according to the present embodiment is thin and lightweight. Further, by heat fusion bonding the laminate films 41 and 42, the exterior packaging bag 40 can be easily formed having a shape that matches the shape of the outer edge of the body unit 300 of the sensor element 30.

The outer resin layer 410 of the exterior packaging bag 40 is made from polyethylene naphthalate (PEN), and the inner resin layer 412 of the exterior packaging bag 40 is made from polypropylene (PP). PEN has superior heat and humidity resistance, heat resistance, and chemical resistance. Therefore, the exterior packaging bag 40 has high heat and humidity resistance, heat resistance, and chemical resistance. Further, PP has a melting point lower than that of PEN.

Therefore, by heat fusion bonding, the laminate films 41 and 42 can be easily bonded. Further, the metal foil 411 of the exterior packaging bag 40 is made of aluminum (Al). Al has a superior moisture-proof property and is also highly conductive. For this reason, a so-called Faraday cage can be formed surrounding the body unit 300. Therefore, an electromagnetic wave generated by the body unit 300 can be inhibited from leaking to the outside of the exterior packaging bag 40. Therefore, noise in the electrical circuit can be reduced. By grounding the metal foil 411, the electromagnetic wave can be released.

In the sensor assembly 3 according to the present embodiment, a load is divided by the convex portions 380 of the load transmitting plate 38 to be input to the sensor thin film 32. The convex portions 380 are formed in a curved surface shape of a predetermined curvature. For this reason, when a load is input to the sensor thin film 32, the shape of the colliding object is hardly reflected. Further, a bending deformation of the sensor thin film 32 is induced by the constraining plate 31 and the elastic plate 37. That is, the energy of the input load is used on bending the sensor thin film 32. Therefore, according to the sensor assembly 3, by measuring the change in the electrical resistance based on the bending deformation of the sensor thin film 32, the load can be accurately detected regardless of the size and shape of the colliding object.

Further, the impact of the input load is absorbed by the elastic plate 37, which is made of acrylic rubber. For this reason, the sensor element 30 is hardly damaged. In addition, due to the restoring force of the elastic plate 37, reproducibility of a response with respect to the load is also high.

Second Embodiment

Figure 7:
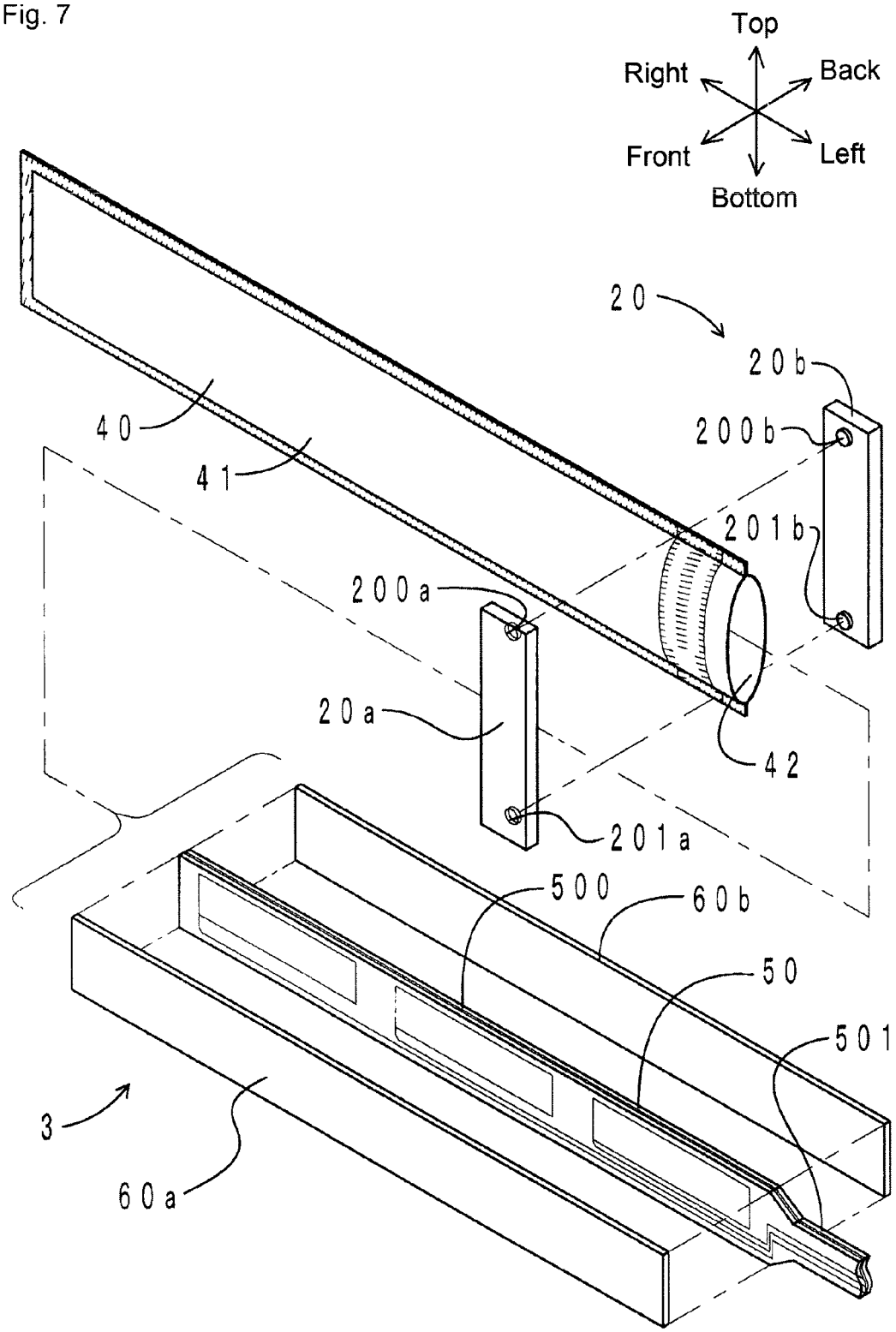
FIG. 7 is an exploded perspective view of a sensor assembly according to a second embodiment.
Figure 8:
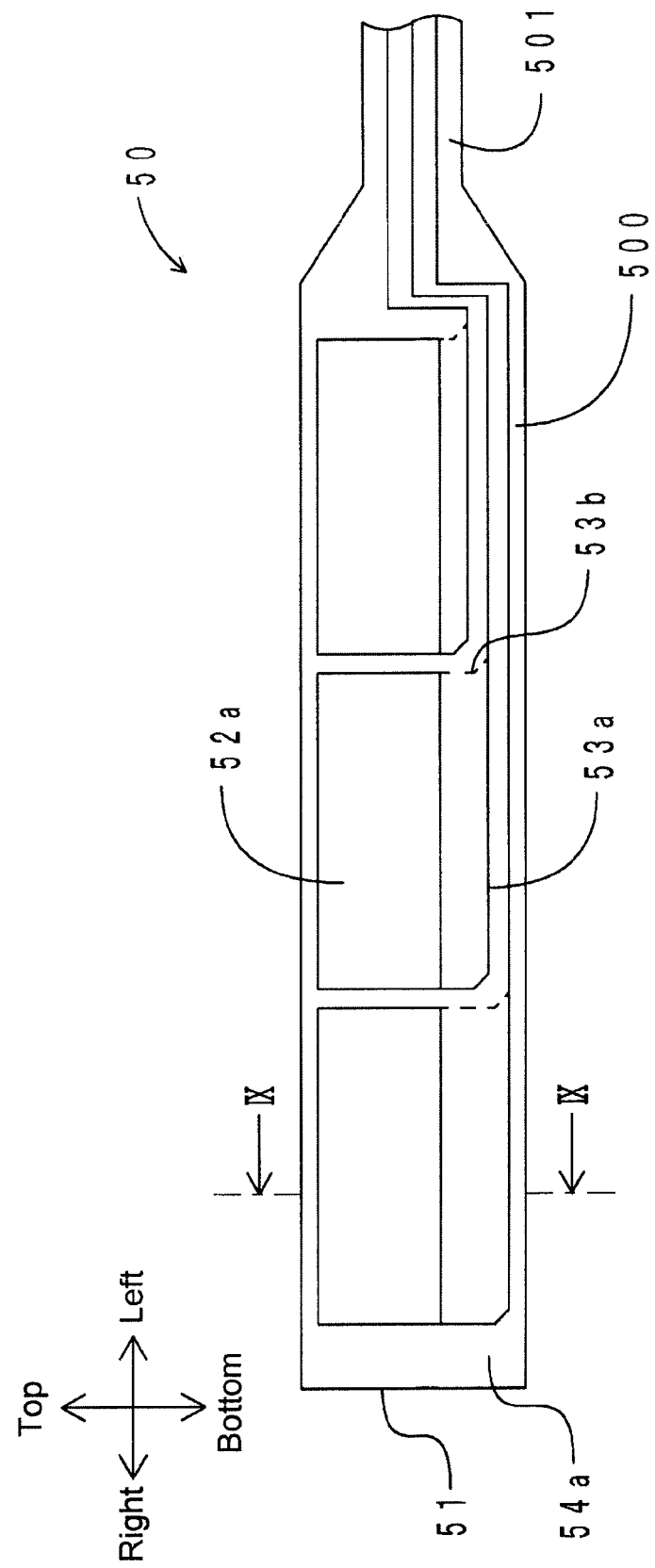
FIG. 8 is a front view of a sensor element in the sensor assembly.
Figure 9:
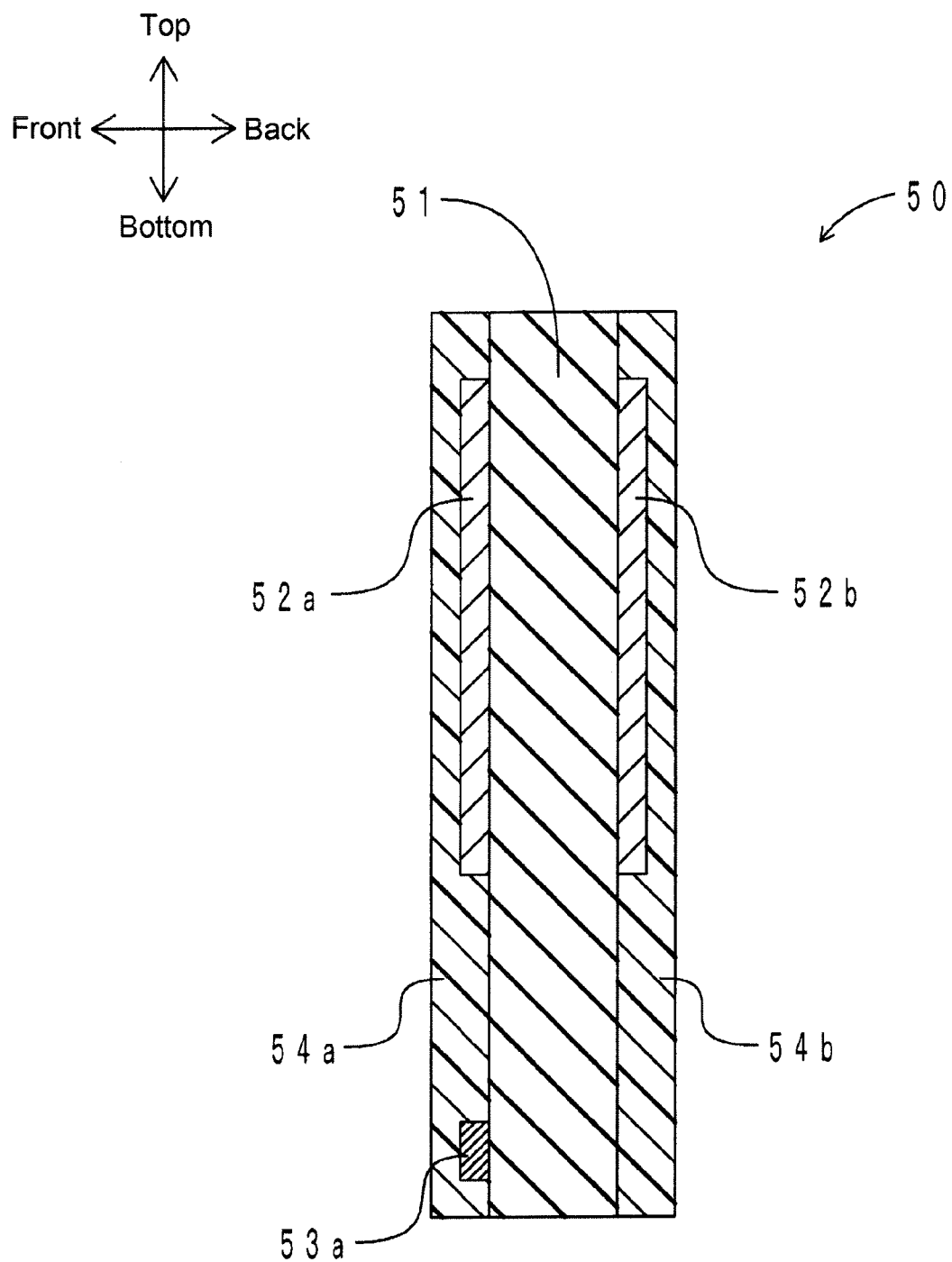
FIG. 9 is a cross-section view along a line IX-IX in FIG. 8.

Differences between a sensor assembly and a sensor module according to the present embodiment and the sensor assembly and the sensor module according to the first embodiment are the configuration of the sensor element and that an insulation plate is interposed between the sensor element and the exterior packaging bag. Therefore, only the differences are explained here. FIG. 7 illustrates an exploded perspective view of the sensor assembly according to the present embodiment. FIG. 8 illustrates a front view of a sensor element in the sensor assembly. FIG. 9 illustrates a cross-section view along a line IX-IX in FIG. 8. In FIG. 7, parts corresponding to those in FIG. 3 are indicated using the same reference numerals. In FIG. 7, for the convenience of explanation, a cover film is transparently illustrated. In FIG. 7, transparently visible portions are illustrated using thin lines.

As FIG. 7 illustrates, the sensor assembly 3 includes a sensor element 50, the exterior packaging bag 40, and two pieces of insulation plates 60a and 60b. The insulation plates 60a and 60b are included in a film member of the present invention. The sensor element 50 has a body unit 500 and a wiring unit 501. The body unit 500 has a sensor thin film 51, which will be described later. The body unit 500 detects a load. The body unit 500 is interposed between the two pieces of insulation plates 60a and 60b. The body unit 500, together with the two pieces of insulation plates 60a and 60b, are enclosed in the exterior packaging bag 40. The wiring unit 501 has wirings 53a and 53b, which will be described later. The wiring unit 501 projects out from the exterior packaging bag 40 toward the left side.

The insulation plate 60a is made of silicone rubber and has a belt-like shape extending in the left-right direction. The insulation plate 60a has a width (length in the up-down direction) of about the same as that of the body unit 500 of the sensor element 50. Further, the insulation plate 60a has a length (length in the left-right direction) of about the same as that of the body unit 500 of the sensor element 50. The insulation plate 60a is arranged on the front side of the body unit 500 of the sensor element 50. Similarly, the insulation plate 60b is made of silicone rubber and has a belt-like shape extending in the left-right direction. The insulation plate 60b has a width (length in the up-down direction) of about the same as that of the body unit 500 of the sensor element 50. Further, the insulation plate 60b has a length (length in the left-right direction) of about the same as that of the body unit 500 of the sensor element 50. The insulation plate 60b is arranged on the rear side of the body unit 500 of the sensor element 50.

As FIGS. 8 and 9 illustrate, the body unit 500 of the sensor element 50 includes the sensor thin film 51, a pair of electrodes 52a and 52b, the pair of wirings 53a and 53b, and cover films 54a and 54b.

The sensor thin film 51 is made of urethane rubber and has a belt-like shape extending in the left-right direction. The sensor thin film 51 has a thickness of about 300 μm.

The electrode 52a has a rectangular shape. There are three electrodes 52a formed on the front surface of the sensor thin film 51 by using screen printing. Similarly, the electrode 52b has a rectangular shape. There are three electrodes 52b formed on the rear surface of the sensor thin film 51 facing the electrodes 52a across the sensor thin film 51. The electrodes 52b are formed on the rear surface of the sensor thin film 51 by using screen printing. As described above, there are three pairs of electrodes 52a and 52b arranged across the sensor thin film 51. The electrodes 52a and 52b are formed from elastomeric material in which Ketjenblack is filled in acrylic rubber. The filling rate of the Ketjenblack in the electrodes 52a and 52b is about 15% by volume when the volume of the electrodes 52a and 52b are each 100% by volume.

The wiring 53a connects to each of the electrodes 52a formed on the front surface of the sensor thin film 51. The wiring 53a is formed on the front surface of the sensor thin film 51 by using screen printing. Similarly, the wiring 53b connects to each of the electrodes 52b (illustrated by dotted lines in FIG. 8) formed on the rear surface of the sensor thin film 51. The wiring 53b is formed on the rear surface of the sensor thin film 51 by using screen printing. The wirings 53a and 53b are formed from an elastomeric material in which silver powder is filled in urethane rubber.

The cover film 54a is made of acrylic rubber, and has a belt-like shape extending in the left-right direction. The cover film 54a covers the front surface of the sensor thin film 51, the electrodes 52a, and the wiring 53a. Similarly, the cover film 54b is made of acrylic rubber, and has a belt-like shape extending in the left-right direction. The cover film 54b covers the rear surface of the sensor thin film 51, the electrodes 52b, and the wiring 53b.

Next, operations of the sensor assembly 3 and the sensor module are explained. For example, when a colliding object (not shown in the drawings) collides against a front bumper of a vehicle, a load is applied from front to the sensor assembly 3, that is, to the sensor element 50 via the insulation plate 60a. This causes the sensor element 50 to undergo a bending deformation in such a manner as to deflect backward. In this case, the film thickness of the sensor thin film 51 decreases. As a result, capacitance between the electrodes 52a and 52b increases. Capacitance data of the sensor thin film 50 is sent via the wirings 53a and 53b, the connector 21, the circuit substrate 24, and the external connection connector 23 to the external occupant protection ECU, and is processed (see the above-mentioned FIG. 1). As described above, the sensor module detects an input load based on a change in the capacitance between the electrodes 52a and 52b.

The sensor assembly and the sensor module according to the present embodiment have the same operation effects as the sensor assembly and the sensor module according to the first embodiment with respect to the portions having common configurations. According to the sensor assembly 3 of the present embodiment, the insulation plates 60a and 60b are arranged between the sensor element 50 and the exterior packaging bag 40. This allows electrical conduction from the electrodes 52a and 52b and the wirings 53a and 53b in the sensor element 50 to be surely blocked. Further, by interposing the insulation plates 60a and 60b, the distances between the electrodes 52a and 52b and the wiring 53a and 53b, and the metal foil of the exterior packaging bag 40 are increased. This reduces noise and allows the capacitance to be accurately detected.

Further, the insulation plates 60a and 60b are made from silicone rubber. On the other hand, the cover films 54a and 54b, which are the outermost surfaces of the sensor element 50, are made from acrylic rubber. That is, the insulation plates 60a and 60b have a friction coefficient smaller than that of the cover films 54a and 54b. Therefore, by interposing the insulation plates 60a and 60b, the body unit 500 of the sensor element 50 becomes slick inside the exterior packaging bag 40. That is, the movement of the body unit 500 is hardly restricted. This allows a load to be accurately detected.

In the sensor element 50, the electrodes 52a and 52b and the wirings 53a and 53b are extendable and contractible. For this reason, the electrodes 52a and 52b and the wirings 53a and 53b can deform to follow the deformation of the sensor thin film 51. Therefore, even when repeatedly used, the electrodes 52a and 52b, the wirings 53a and 53b, and the sensor thin film 51 are unlikely to peel off each other. That is, the sensor assembly 3 is superior in durability.

Third Embodiment

Figure 10:
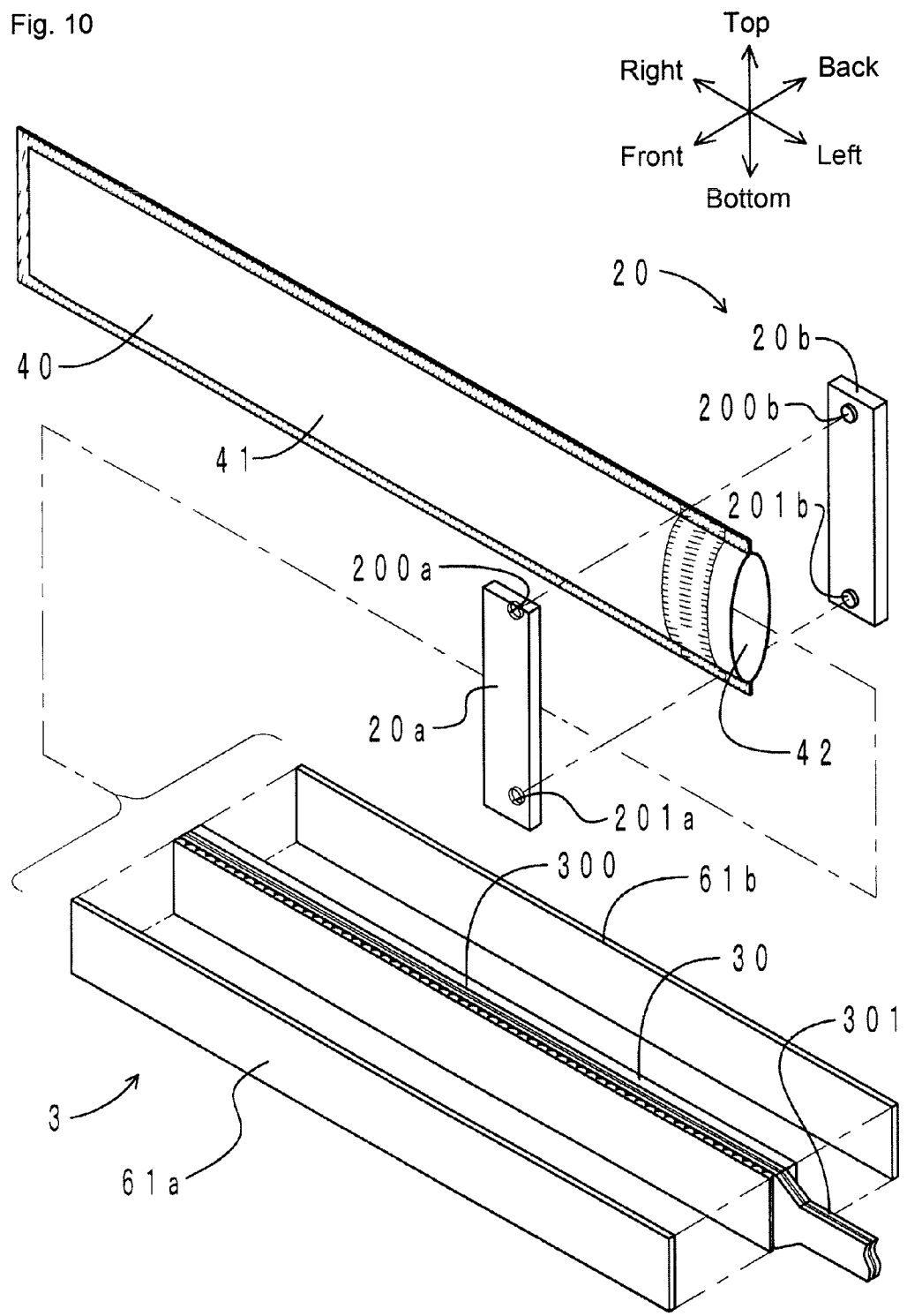
FIG. 10 is an exploded perspective view of a sensor assembly according to a third embodiment.

A difference between a sensor assembly and a sensor module according to the present embodiment and the sensor assembly and the sensor module according to the first embodiment is that a film member is interposed between the sensor element and the exterior packaging bag. Therefore, only the difference is explained here. FIG. 10 illustrates an exploded perspective view of the sensor assembly according to the present embodiment. In FIG. 10, portions corresponding to those in FIG. 3 are indicated using the same reference numerals. In FIG. 10, transparently visible portions are illustrated using thin lines.

As FIG. 10 illustrates, the sensor assembly 3 includes the sensor element 30, the exterior packaging bag 40, and two sheets of film members 61a and 61b. The body unit 300 of the sensor element 30 is interposed between the two sheets of film members 61a and 61b. The body unit 300, together with the two sheets of film members 61a and 61b, are enclosed in the exterior packaging bag 40.

The film member 61a is made of polyoxymethylene (POM) and has a belt-like shape extending in the left-right direction. The film member 61a has a width (length in the up-down direction) of about the same as that of the body unit 300 of the sensor element 30. Further, the film member 61a has a length (length in the left-right direction) of about the same as that of the body unit 300 of the sensor element 30. The film member 61a is arranged on the front side of the body unit 300 of the sensor element 30. Similarly, the film member 61b is made of polyoxymethylene (POM) and has a belt-like shape extending in the left-right direction. The film member 61b has a width (length in the up-down direction) of about the same as that of the body unit 300 of the sensor element 30. Further, the film member 61b has a length (length in the left-right direction) of about the same as that of the body unit 300 of the sensor element 30. The film member 61b is arranged on the rear side of the body unit 300 of the sensor element 30.

The sensor assembly and the sensor module according to the present embodiment have the same operation effects as the sensor assembly and the sensor module according to the first embodiment with respect to the portions having common configurations. According to the sensor assembly 3 of the present embodiment, the film members 61a and 61b are arranged between the sensor element 30 and the exterior packaging bag 40. The film members 61a and 61b are made from polyoxymethylene (POM). Therefore, the film members 61a and 61b have a friction coefficient smaller than that of the inner surface (PP layer) of the exterior packaging bag 40, and also smaller than that of the outermost surface, that is, the elastic plate 37 (acrylic rubber) and the load transmitting plate 38 (ABS), of the body unit 300 of the sensor element 30. Therefore, by interposing the film members 61a and 61b, the body unit 300 of the sensor element 30 becomes slick inside the exterior packaging bag 40. That is, the movement of the body unit 300 is hardly restricted. This allows a load to be accurately detected.

Fourth Embodiment

A difference between a sensor assembly and a sensor module according to the present embodiment and the sensor assembly and the sensor module according to the first embodiment is mainly the configuration of the sensor element. Therefore, only the difference is explained here.

Figure 12:
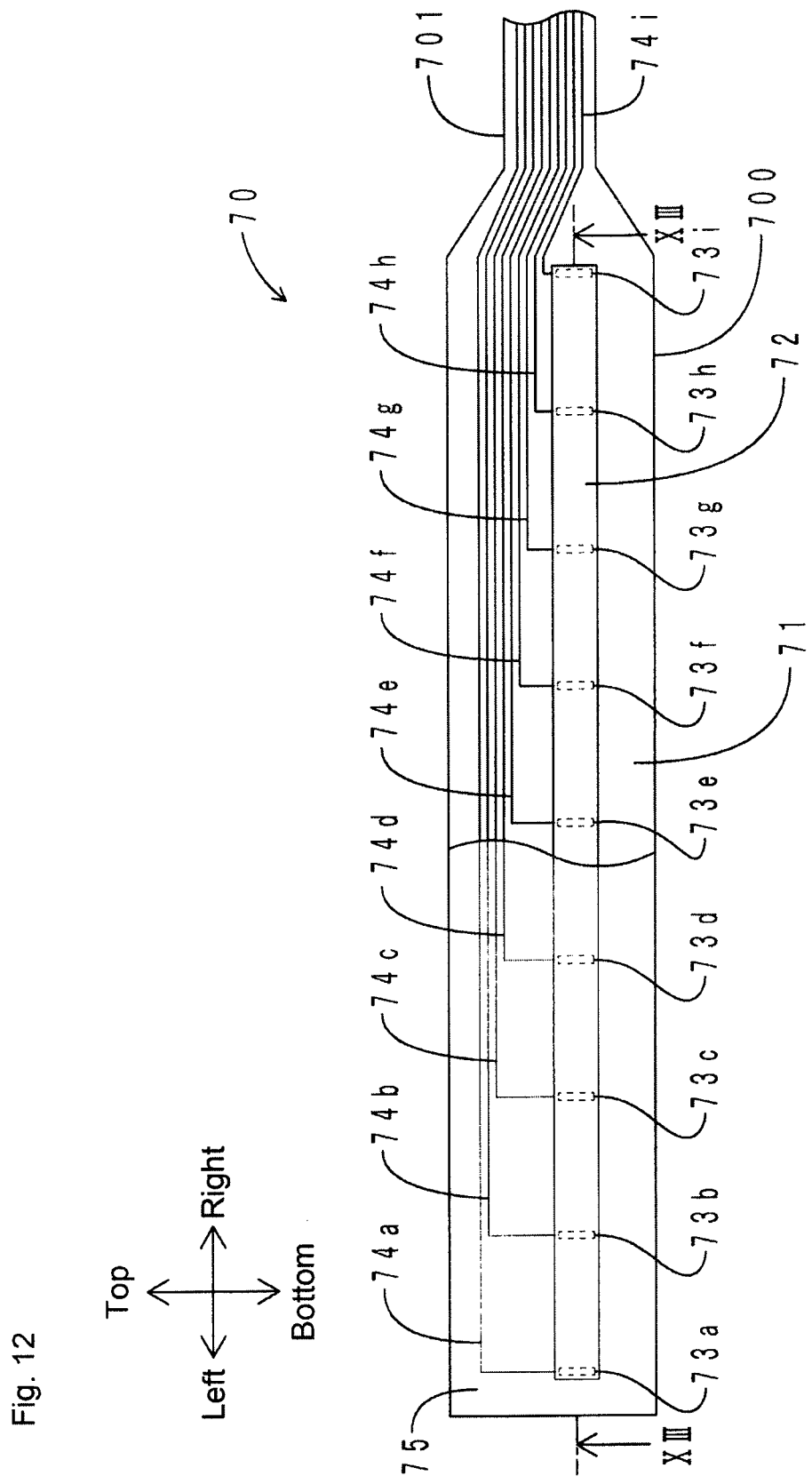
FIG. 12 is rear view of a sensor element in a sensor assembly according to a fourth embodiment.
Figure 13:
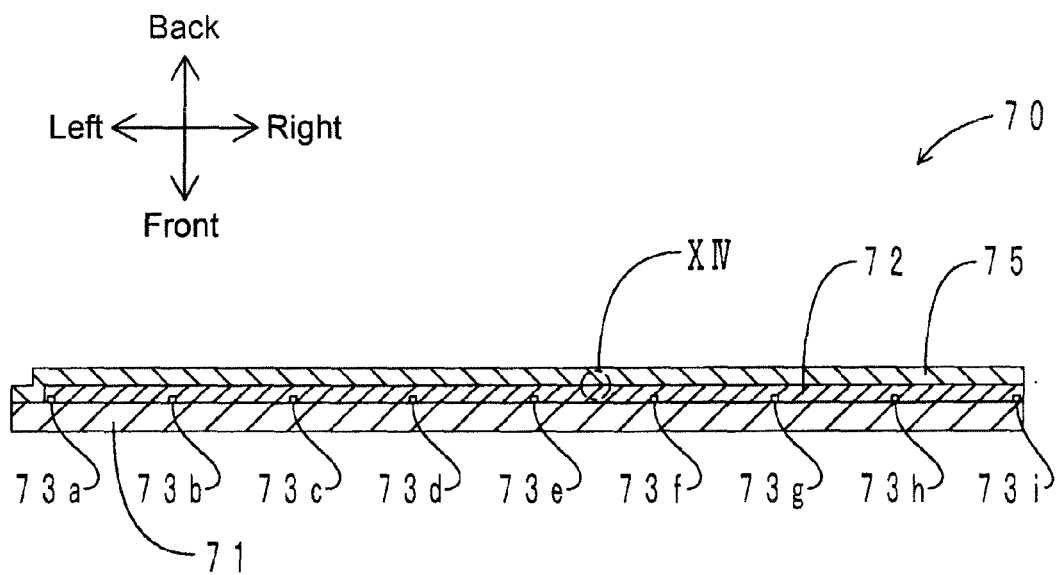
FIG. 13 is a cross-section view along a line XIII-XIII in FIG. 12.
Figure 14:
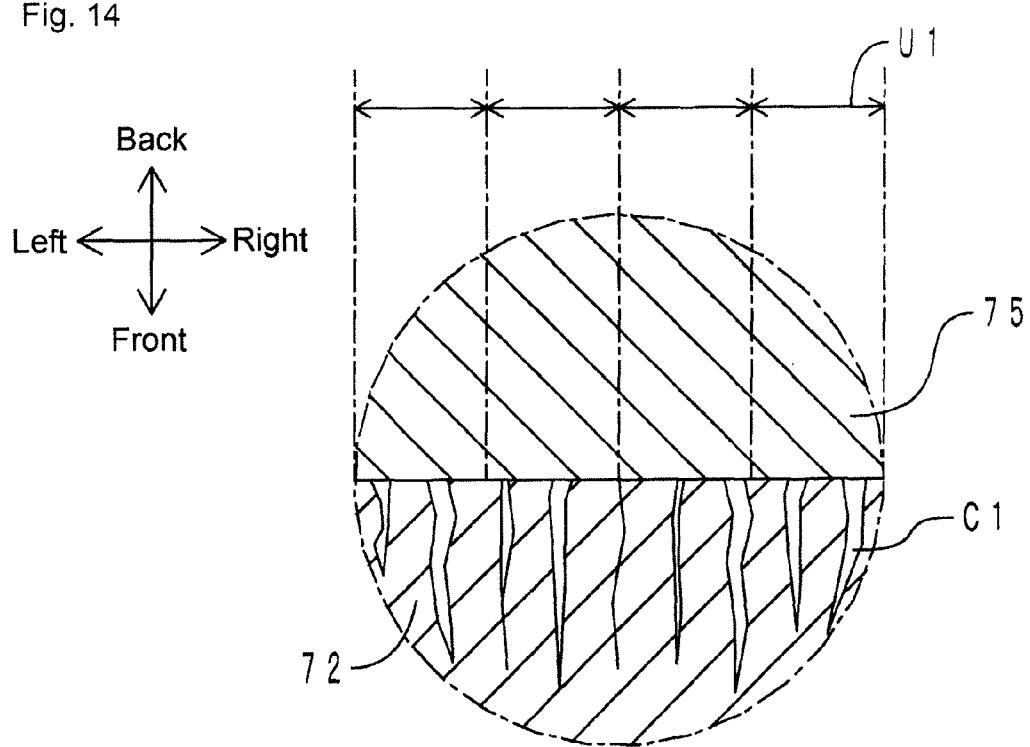
FIG. 14 is an enlarged view within a circle XIV in FIG. 13.

The sensor module according to the present embodiment is installed on the back side (rear side) of the front bumper so that a load is input to the sensor assembly via the front bumper. Therefore, in the present embodiment, directions in the above-mentioned FIG. 1 are defined so that the front and rear sides are reversed. In the present embodiment, a load is input from front to the front bumper. Thereafter, along with the deformation of the front bumper, the load is transmitted to the sensor assembly. That is, the load is input to the sensor element from the side of a base material, which will be described later. FIG. 12 illustrates a rear view of the sensor element in the sensor assembly according to the present embodiment. FIG. 13 illustrates a cross-section view along a line XIII-XIII in FIG. 12. FIG. 14 illustrates an enlarged view within a circle XIV in FIG. 13. For the convenience of explanation, in FIG. 12, the cover film is illustrated with the right half removed.

As FIG. 12 illustrates, the sensor element 70 has a body unit 700 and a wiring unit 701. The body unit 700 has a sensor thin film 72, which will be described later. The body unit 700 detects deformation of the front bumper (measured object). The body unit 700 is enclosed in the exterior packaging bag 40 (see above-mentioned FIG. 1). The wiring unit 701 has wirings 74a-74i, which will be described later. The wiring unit 701 projects out from the exterior packaging bag 40 toward the right side.

As FIGS. 12 and 13 illustrate, the sensor element 70 includes a base material 71, a sensor thin film 72, electrodes 73a-73i, wirings 74a-74i, and a cover film 75.

The base material 71 is made of polyimide and has a belt-like shape extending in the left-right direction. The base material 71 has a film thickness of about 300 μm. The sensor thin film 72, the electrodes 73a-73i, the wirings 74a-74i, and the cover film 75 are all formed on the rear side of the base material 71 by using a screen printing method.

The sensor thin film 72 has a belt-like shape extending in the left-right direction. The sensor thin film 72 has a film thickness of about 100 μm. The sensor thin film 72 is secured on the rear surface of the base material 71. The sensor thin film 72 is formed in which carbon beads (conductive filler) are filled in epoxy resin. The filling rate of the carbon beads is about 45% by volume when the volume of the sensor thin film 72 is 100% by volume. As FIG. 14 schematically illustrates, in the sensor thin film 72, a plurality of cracks C1 are formed in advance. The cracks C1 are arranged extending in a direction intersecting the arrangement direction (left-right direction) of the electrodes 73a-73i, that is, in the thickness direction (front-rear direction) of the sensor thin film 72. About two of the cracks C1 are formed in each unit section U1 of about 2 mm along the left-right direction of the sensor thin film 72.

The electrodes 73a-73i are arranged in such a manner as to divide the sensor thin film 72 into eight divisions along the left-right direction. The electrodes 73a-73i each have a strip-like shape extending the up-down direction. The electrodes 73a-73i are each interposed between the sensor thin film 72 and the base material 71. A measurement section is partitioned by a pair of neighboring electrodes (for example, electrodes 73a and 73b). The wirings 74a-74i are formed on the rear surface of the base material 71. The wirings 74a-74i respectively connect to the electrode 73a-73i. The electrodes 73a-73i and the wirings 74a-74i are formed from silver paste.

The cover film 75 is made of acrylic rubber and has a belt-like shape extending in the left-right direction. The cover film 75 covers the base material 71, the sensor thin film 72, and the wirings 74a-74i from the rear side.

Next, a production method of the sensor element 70 is explained. The production method of the sensor element 70 includes a coating material preparation process, a printing process, a bending curing process, an unloading process, and a cover film forming process.

In the coating material preparation process, coating materials for forming the sensor thin film 72, the electrodes 73a-73i, the wirings 74a-74i, and the cover film 75 are respectively prepared. In the printing process, coating materials, except a cover film coating material, are printed on the surface of the base material using screen printing equipment. First, on the surface of the base material, an electrode coating material and a wiring coating material are sequentially printed. Next, the coated film is cured, and the electrodes 73a-73i and the wirings 74a-74i are formed. Next, on the surface of the base material 71 on which the electrodes 73a-73i are formed, a sensor coating material is printed.

Figure 15:
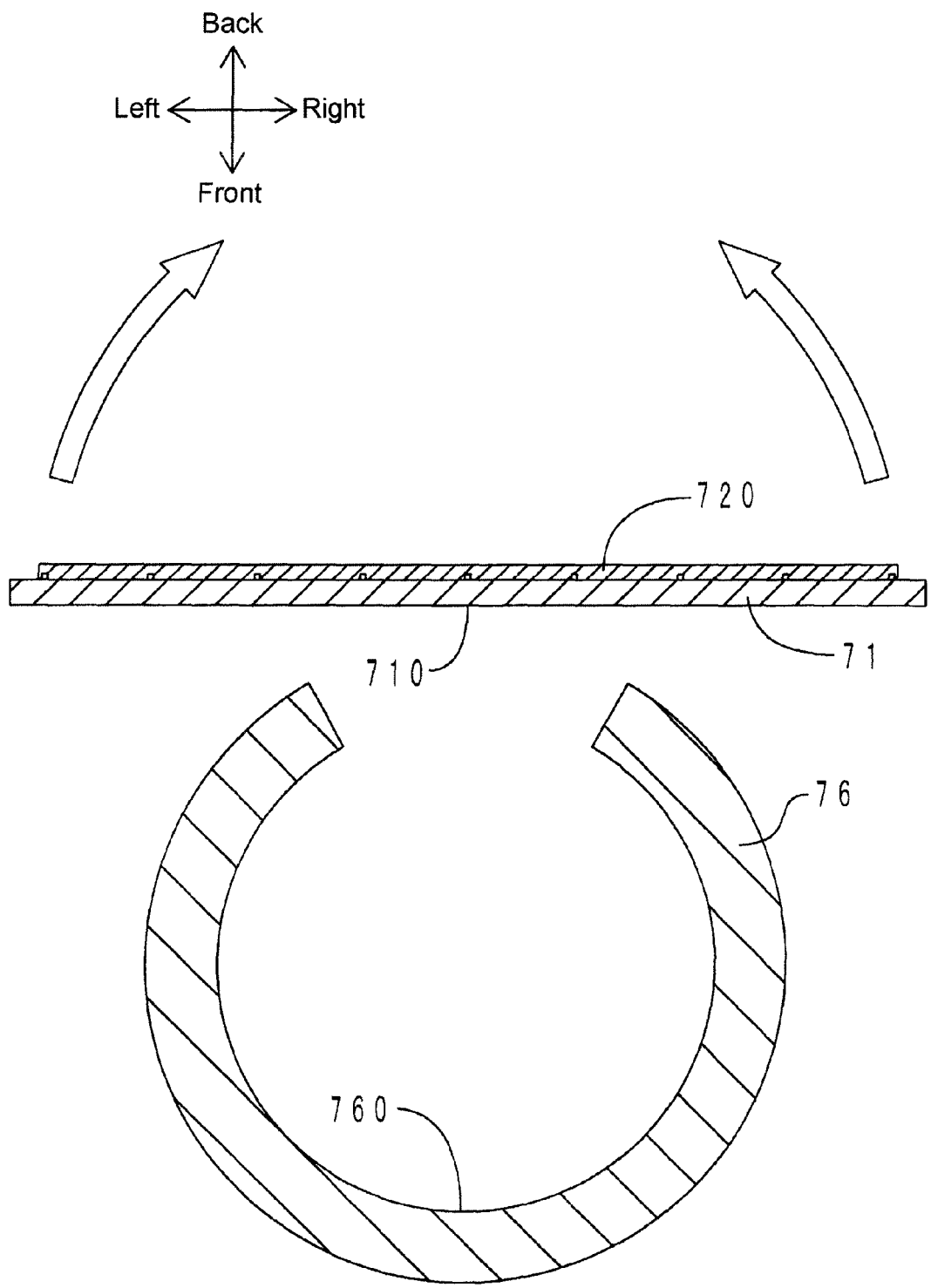
FIG. 15 is a schematic view of a first half of a bending curing process of a production method of a sensor element according to the fourth embodiment.
Figure 16:
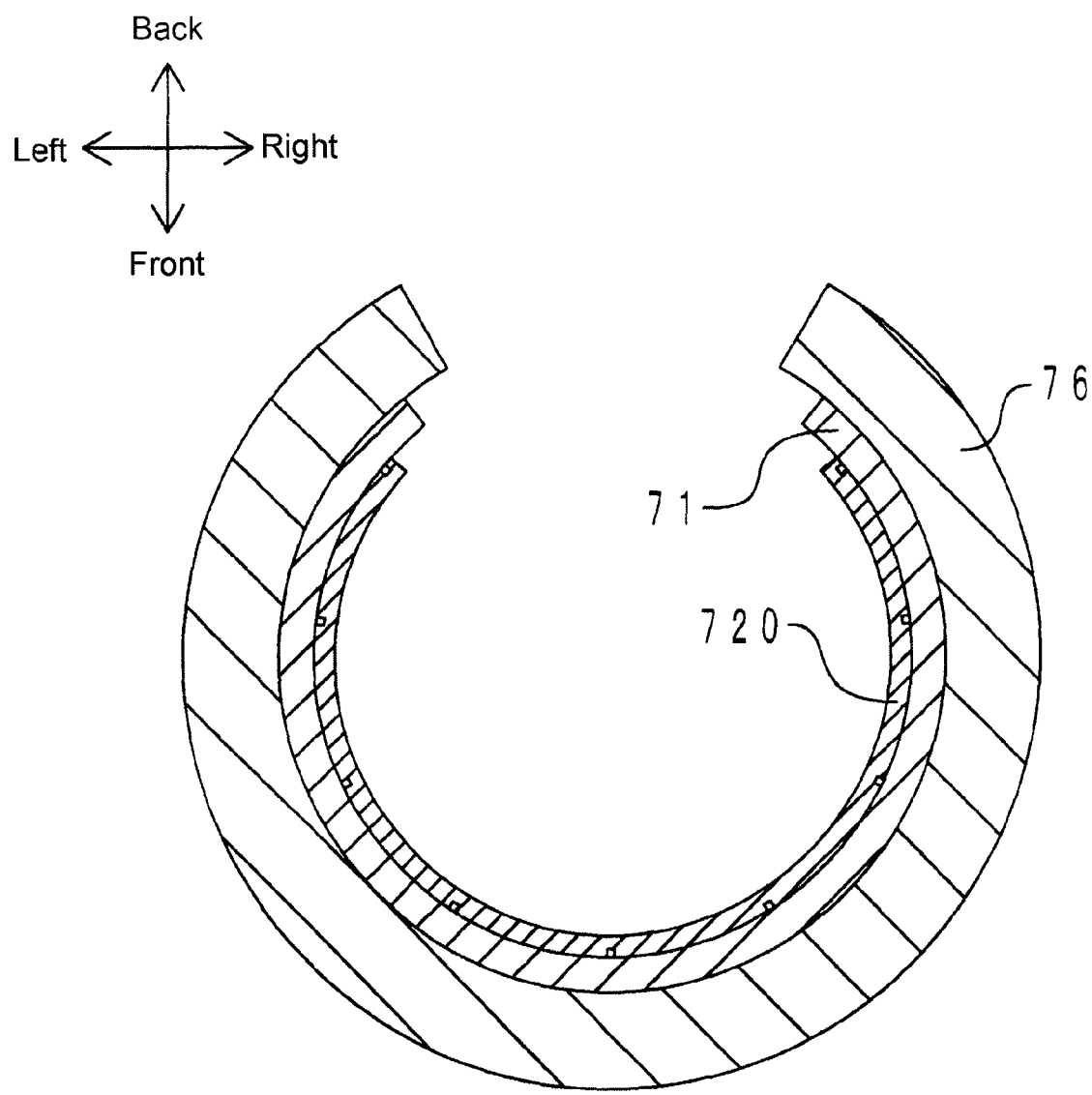
FIG. 16 is a schematic view of a second half of the bending curing process.

In the bending curing process, the base material 71 is bent in such a manner that the coated film of the sensor coating material is on an inner side, and is heated in such a state to cure the coated film. FIG. 15 illustrates a schematic view of a first half of the bending curing process. FIG. 16 illustrates a schematic view of a second half of the bending curing process.

First, as FIGS. 15 and 16 illustrate, the base material 71 on which the coated film 720 of the sensor coating material is formed is applied to an inner periphery 760 of a C-shaped mold 76. In this case, a front surface 710 of the base material 71 is in contact with the inner periphery 760 of the mold 76. Next, the mold 76 is placed in a drying furnace and kept for 1 hour at a temperature of about 140° C. to subject the coated film 720 to a primary curing. Next, the coated film 720 is kept for 2 hours at a temperature of about 170° C. to subject the coated film 720 to a secondary curing.

In the unloading process, the base material 71 together with the cured coated film 720 are peeled off from the mold 76, and the base material 71 and the cured coated film 720 are restored from the bent state to their original planar state (see above-mentioned FIG. 15). In the present process, a strain is input to the cured coated film 720 (sensor thin film 72) and cracks are formed therein. As described above, the sensor thin film 72 is formed.

In the cover film forming process, the cover film coating material prepared in the coating material preparation process is printed using a screen printing equipment. Thereafter, the coated film is cured to form the cover film 75. By the above processes, the sensor element 70 is produced.

Next, operations of the sensor assembly and the sensor module according to the present embodiment are explained. When a colliding object (not shown in the drawings) collides against the front bumper from front, the front bumper deforms in a manner being depressed backward. The deformation of the front bumper is transmitted to the sensor assembly, that is, to the sensor element 70. This causes the sensor thin film 72, together with the base material 71 and the cover film 75, to undergo a bending deformation in a manner deflecting backward. At an initial stage of the collision, the deflecting of the sensor thin film 72 causes cracks in the sensor thin film 72 to open up. For this reason, conductive paths are cut off. In addition, the conductive paths are cut off due to changes in the contact state of the particles of the conductive filler. This causes the electrical resistance detected in a bending-deformed section to become larger as compared to that in the pre-collision state. Data such as the electrical resistance, voltage, and the like for each of the measurement sections of the sensor thin film 72 is sent via the wirings 74a-74i, the connector 21, the circuit substrate 24, and the external connection connector 23 to the external occupant protection ECU, and is processed (see above-mentioned FIG. 1). As described above, the sensor module detects the deformation of the front bumper based on an increase in the electrical resistance due to the bending deformation of the sensor thin film 72.

Figure 17A:
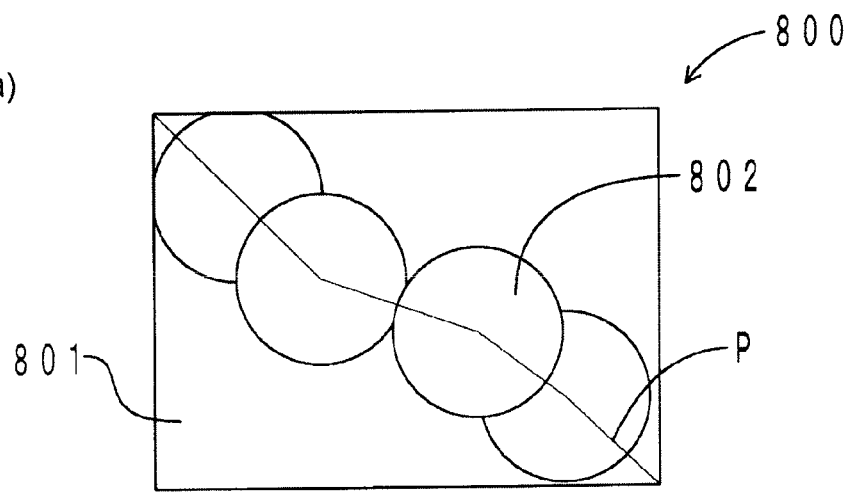
FIG. 17(a) is an enlarged schematic view near a portion of conductive filler in a sensor thin film in a no-load state before a bending deformation.
Figure 17B:
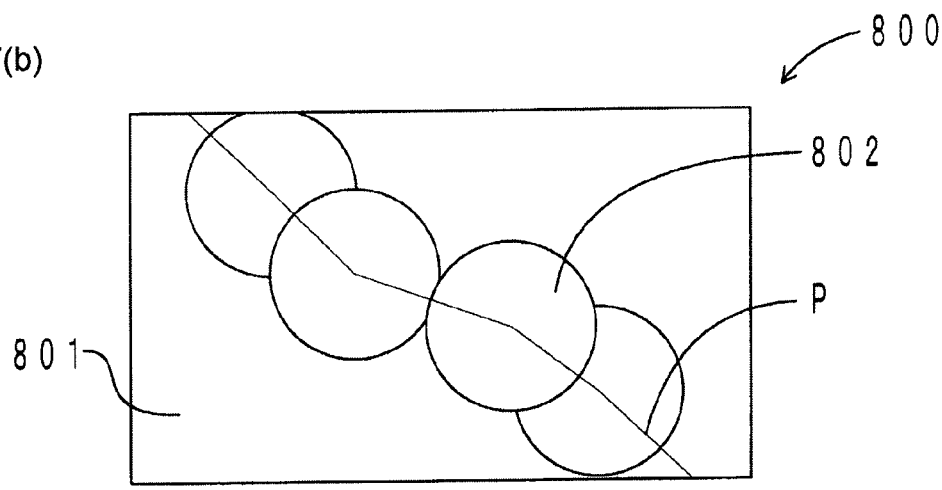
FIG. 17(b) is an enlarged schematic view near the portion of the conductive filler in the sensor thin film in a state immediately after the bending deformation.
Figure 17C:
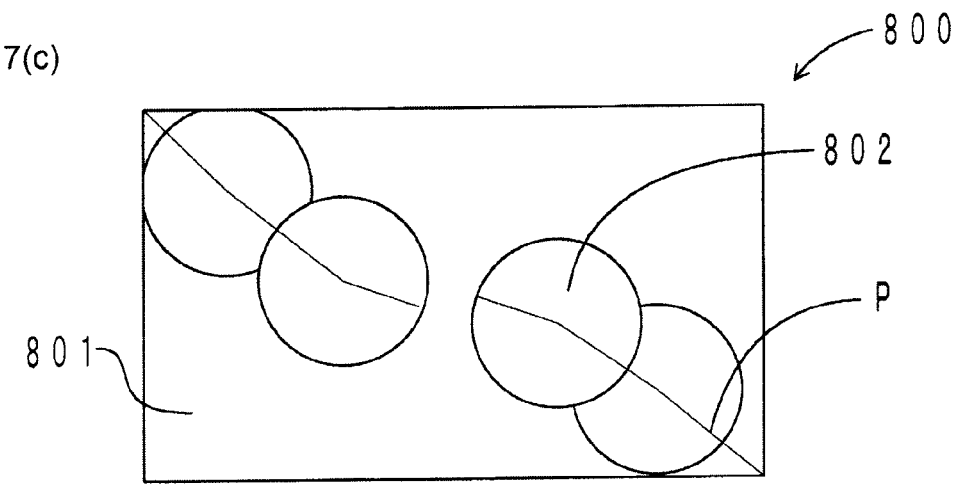
FIG. 17(c) is an enlarged schematic view near the portion of the conductive filler in the sensor thin film in a state further after the state immediately after the bending deformation.
Figure 18A:
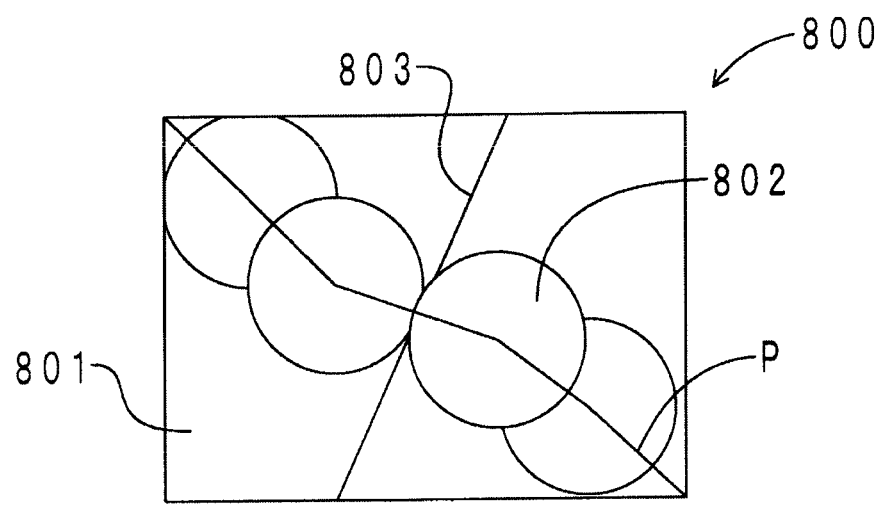
FIG. 18(a) is an enlarged schematic view near a portion of a crack in the sensor thin film in the no-load state before the bending deformation.
Figure 18B:
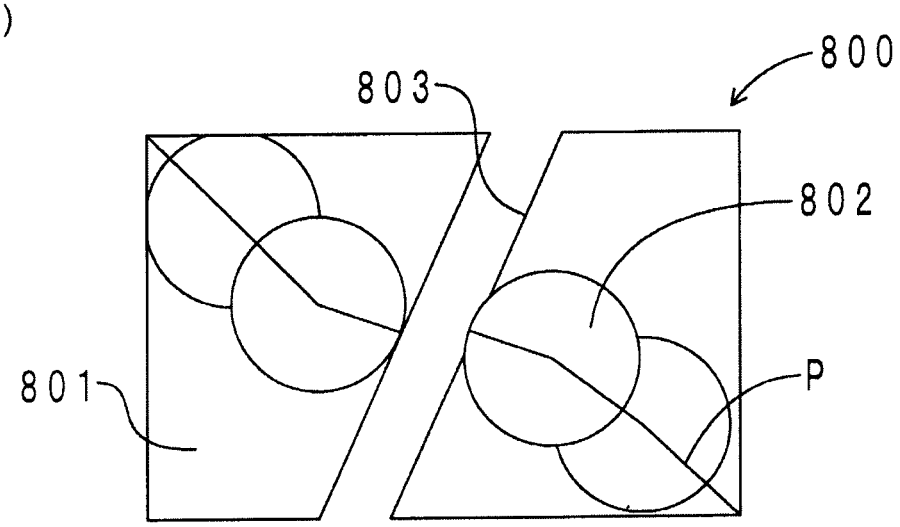
FIG. 18(b) is an enlarged schematic view near the portion of the crack in the sensor thin film in the state after the bending deformation.

The sensor assembly and the sensor module according to the present embodiment have the same operation effects as the sensor assembly and the sensor module according to the first embodiment with respect to the portions having common configurations. Further, according to the sensor assembly of the present embodiment, the bending of the sensor thin film 72 causes the cracks C1 to open up. This causes the conductive paths to be cut off and the electrical resistance of the sensor thin film 72 to rapidly increase. Therefore, response delay is small. Further, the conductive paths are cut off primarily due to opening up of the cracks C1. Therefore, as compared to the case where the cutting off of the conductive paths depends only on the elastic deformation of the parent material (see above-mentioned FIG. 17), even a small strain can be detected with a good accuracy. In addition, the response speed is less dependent on atmospheric temperature and the input speed of a strain.

Further, the sensor thin film 72 is covered by the cover film 75. This inhibits deterioration of the sensor thin film 72. Further, when the load is removed after the bending deformation, with the help of the elastic restoring force of the cover film 75, the sensor thin film 72 easily restores its original shape.

<Other>

In the above, the embodiments of the sensor assembly and the sensor module according to the present invention were explained. However, an embodiment is not particularly limited to the above-described embodiments. The present invention can also be carried out in various modified and improved modes by a person skilled in the art.

For example, in the above embodiments, the exterior packaging bag is formed from a laminate film having a PEN/Al/PP three-layer structure. However, the configuration of the laminate film is not limited to the above embodiments. For example, in the case where the three-layer structure of outer resin layer/metal foil/inner resin layer is adopted, as the resin of the outer resin layer, polyphenylene sulfide (PPS), polyethylene terephthalate (PET), polyethylene (PE), polypropylene (PP), polyamide (PA), polycarbonate (PC), polyoxymethylene (POM), polymethylmethacrylate (PMMA), polyvinyl chloride resin (PVC), fluorine resin (polytetrafluoroethylene (PTFE), tetrafluoroethylene-ethylene copolymer (ETFE), and the like), ethylene-vinyl alcohol copolymer resin (EVOH), and the like, may be used. As the metal foil, tin, copper, stainless steel, zinc, and the like, may be used. As the resin of the inner resin layer, similar to the outer resin layer, PPS, PET, PE, PP, PA, PC, POM, PMMA, PVC, fluorine resin (PTFE, ETFE, and the like), EVOH, and the like, may be used. It is desirable that a resin used for the inner resin layer have a melting point lower than that of the outer resin layer. Further, as needed, other layers may be laminated on the above three layers to form a structure of four or more layers. Further, thickness of each layer is not particularly limited.

In the above first, third and fourth embodiments, a sensor element is used in which electrical resistance of the sensor thin film changes due to a deformation. In the second embodiment, a sensor element is used in which capacitance changes due to a deformation. The type, configuration, shape, size, and the like of the sensor element are not limited to the above embodiments.

For example, in the first, third and fourth embodiments, the parent material of the sensor thin film may be suitably selected from resin and elastomer, by taking into account compatibility with the conductive filler. The number of the electrodes and arrangement locations may be suitably set. The base material (including the constraining plate and the insulation films) and the material of the cover film are not particularly limited as long as they are insulating materials. It is desirable that the base material be a material that can restrict a deformation of one side of the sensor thin film. In addition to PET and polyimide (PI) in the above embodiments, flexible resin films such as PE, PEN and the like are preferred. In the first and third embodiments, it is also possible that the insulation film and cover film are not arranged.

Further, the material, shape, and the like of the elastic plate and the load transmitting plate are not particularly limited. For example, in the first and third embodiments, the convex portions all have the same curvature. However, it is also possible to allow a portion of the plurality of convex portions, or each of the convex portions, to have a different curvature. By varying the curvature of the convex portions, the relation between a load and an output can be adjusted. Further, the greater the curvature of the convex portions of the load transmitting plate is, the greater the amount of bending deformation of the sensor thin film due to depressing by the convex portions will be. Therefore, detection sensitivity of a load can be improved. The number of the convex portions may be suitably determined by taking into account the shape and size of an anticipated colliding object. The greater the number of convex portions is, the more finely the shape of the colliding object can be divided. For this reason, dependence on the shape of the colliding object can be further reduced. It is also possible that the elastic plate and the load transmitting plate are not arranged.

Further, in the fourth embodiment, the method for forming the cracks in the sensor thin film is not particularly limited. For example, it is possible to form convexo-concave portions in advance on a surface of a base material, print the sensor coating material on the convexo-concave surface, and cure the coated film. By doing so, stress is concentrated on corner portions of the convexo-concave portions when the coated film is cured. Thereby, cracks are easily formed. After curing, it is desirable that the sensor thin film be further subjected to bending processing. By doing so, cracks can be increased in number and can be dispersed in the parent material. Further, by devising distribution and the like of the convexo-concave portions to be formed, distribution of the cracks and the like can be adjusted.

Further, in the second embodiment, the type of the elastomer of the sensor thin film is not particularly limited. For example, from a point of view of increasing the capacitance, a material having a large relative permittivity is preferred. Further, it is desirable that the electrodes and wirings be flexible and deformable together with the sensor thin film. In the second embodiment, three pairs of opposing electrodes are formed across the sensor thin film. However, the number, size, arrangement, and the like of the electrodes, may be suitably determined according to an intended use. Further, in the second embodiment, the electrodes and wirings are formed on the front surface and rear surface of the sensor thin film, respectively. However, the sensor thin film, the electrodes, and the wirings may also be formed on a surface of an insulating base material. It is also possible that the cover film is not arranged. Further, the material of the insulation plate is not particularly limited as long as it is an insulating material. Various elastomers, including silicone rubber, can be used.

Further, in the third embodiment, the material of the film member is not particularly limited. From a point of view of having a small friction coefficient, in addition to POM, fluorine resin such as PTFE and ETFE are preferable.

In the above embodiments, one edge of the exterior packaging bag is sealed by using the packing member. Here, the shape, material, and the like of the packing member are not particularly limited. Further, the shape and material of the circuit case, as well as the manner in which the circuit case connects to an external electronic device, and the like, are not particularly limited.

Working Example

Figure 11:
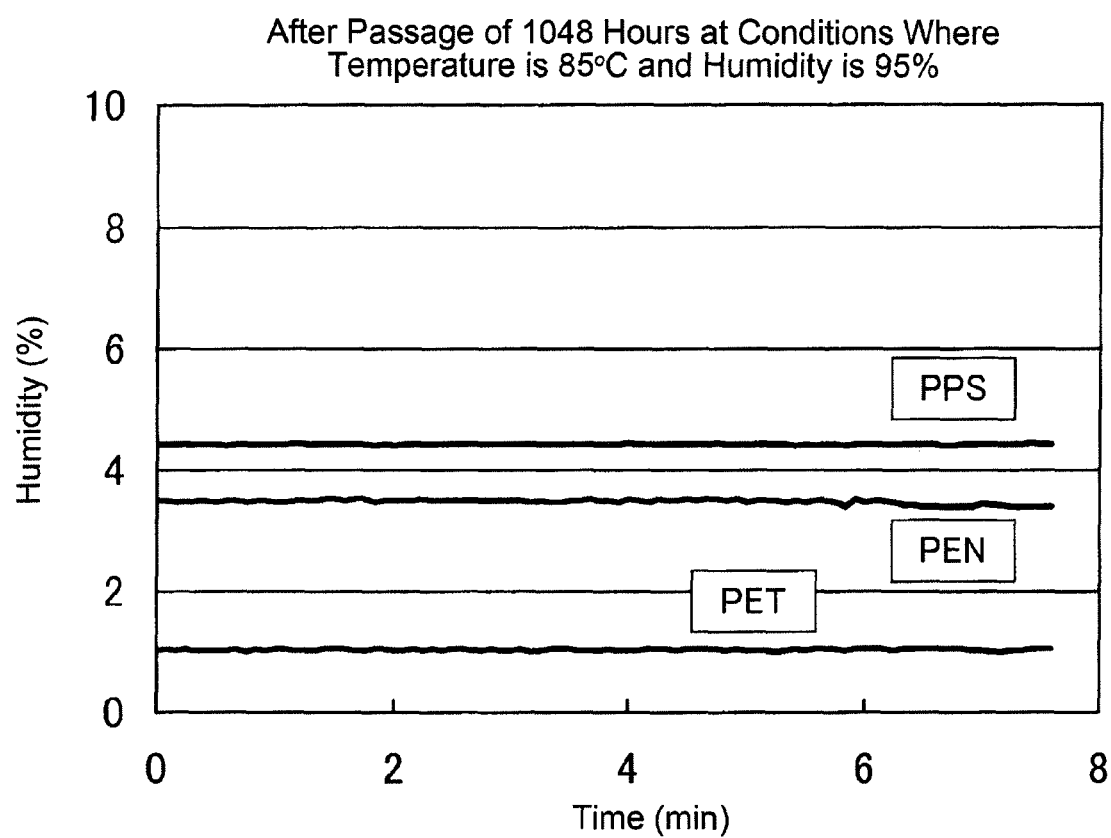
FIG. 11 is a graph illustrating measurement results of humidity inside an exterior packaging bag according to a working example.

Heat and humidity resistance of the exterior packaging bag used in the above embodiments was experimentally evaluated. First, three kinds of exterior packaging bags having different kinds of outer resin layers were prepared. One of the outer resin layers of the three kinds of exterior packaging bags was made of polyethylene naphthalate (PEN), which was the same as in the above embodiments. The remaining two were respectively made of polyphenylene sulfide (PPS) and polyethylene terephthalate (PET). The outer resin layers all had a thickness of 12 μm. Configurations other than the outer resin layers of the exterior packaging bags were the same as in the above embodiments. Next, a temperature and humidity sensor was placed in each of the exterior packaging bags, and after deaeration, the opening was sealed using the packing member. Next, these exterior packaging bags were kept in a constant temperature and humidity chamber in which a temperature of 85° C. and a humidity of 95% were maintained. After 1048 hours, the temperature and humidity inside the exterior packaging bags were measured. FIG. 11 illustrates measurement results of the humidity inside the exterior packaging bags.

As FIG. 11 illustrates, in all of the exterior packaging bags, the internal humidity was maintained at 5% or less. The internal temperature was constant at about 85° C. Based on the above, it was confirmed that the exterior packaging bag formed from the laminate film having a structure of resin layer/metal foil/resin layer has superior heat and humidity resistance. Therefore, by enclosing a component such as a sensor element and the like in the exterior packaging bag, deterioration of the sensor component in a hot and humid environment can be inhibited. That is, the sensor assembly and the sensor module according to the present invention have superior heat and humidity resistance and ensure a long life.

INDUSTRIAL APPLICABILITY

The sensor assembly and the sensor module according to the present invention can be applied to various applications including a collision sensor in an automobile and the like; a soft pressure sensor such as a seating sensor and artificial skin; a data input device such as a keyboard; a surface pressure distribution sensor for a bed and a carpet; and the like.

What is claimed is:
1. A sensor assembly comprising:
a sensor element; and
an exterior packaging bag enclosing the sensor element, the sensor element comprising:
    a sensor thin film comprising one of resin and elastomer, the sensor thin film further comprising cracks;
    at least one pair of electrodes connected to the sensor thin film; and
    an elastically deformable cover film covering the sensor thin film, wherein
the exterior packaging bag comprises a laminate film having a metal foil and two resin layers sandwiching the metal foil,
the cracks are provided in advance and extend in a direction such that conductive paths in the sensor thin film are cut off when a bending deformation occurs.
2. The sensor assembly according to claim 1, wherein, of the two resin layers, an inner resin layer arranged on an inner side has a melting point lower than a melting point of an outer resin layer arranged on an outer side.
3. The sensor assembly according to claim 2, wherein the outer resin layer comprises at least one selected from polyphenylene sulfide, polyethylene terephthalate, polyethylene naphthalate, polyethylene, polypropylene, polyamide, polycarbonate, polyoxymethylene, polymethylmethacrylate, polyvinyl chloride resin, fluorine resin, and ethylene-vinyl alcohol copolymer resin.
4. The sensor assembly according to claim 1, wherein the metal foil comprises at least one selected from aluminum, tin, copper, stainless steel, and zinc.
5. The sensor assembly according to claim 1, wherein a film member is interposed between the exterior packaging bag and the sensor element, the film member having a friction coefficient smaller than that of at least one of an inner surface of the exterior packaging bag and an outermost surface of the sensor element.
6. The sensor assembly according to claim 1, wherein
the sensor thin film comprises a conductive filler filled in parent material of one of the resin and the elastomer; and
the sensor element further comprises an insulating base material arranged on a surface of the sensor thin film, and detects an input load based on a change in electrical resistance due to deformation of the sensor thin film.
7. The sensor assembly according to claim 6, wherein
the sensor element further comprises an elastic plate, which is arranged on the sensor thin film side or the base material side, and which elastically deforms due to an input load, thereby causing the sensor thin film to undergo bending deformation; and
the sensor element detects the input load based on a change in electrical resistance due to the bending deformation of the sensor thin film.
8. The sensor assembly according to claim 6, wherein
the sensor element further comprises a load transmitting plate arranged on a load input side of the sensor thin film;
the load transmitting plate has a plurality of convex portions having curved surface shapes; and
the input load is transmitted to the sensor thin film via the plurality of convex portions.
9. The sensor assembly according to claim 1, wherein
the sensor thin film comprises the elastomer;
the pair of electrodes are arranged across the sensor thin film; and
the sensor element detects an input load based on a change in capacitance between the pair of electrodes.
10. The sensor assembly according to claim 1, wherein the cracks are provided such that the conductive paths are provided in the sensor thin film in a no-load state before the bending deformation occurs, and the cracks are opened up to cut off the conductive paths when the bending deformation occurs.
11. A sensor assembly comprising:
a sensor element; and
an exterior packaging bag enclosing the sensor element, the sensor element comprising:
    a sensor thin film comprising one of resin and elastomer, the sensor thin film further comprising cracks; and
    at least one pair of electrodes connected to the sensor thin film,
wherein the exterior packaging bag comprises a laminate film having a metal foil and two resin layers sandwiching the metal foil,
the sensor thin film comprises conductive filler filled at a filling rate of 30% or more by volume in a resin parent material;
three-dimensional conductive paths are provided in the sensor thin film via contact among particles of the conductive filler; and
the sensor element further comprises an insulating base material on a surface of the sensor thin film, and detects deformation of a measured object based on an increase in electrical resistance due to a bending deformation of the sensor thin film,
the sensor element further comprises an elastically deformable cover film covering the sensor thin film; and
the cracks are provided in advance and extend in a direction such that the conductive paths are cut off when a bending deformation occurs.
12. The sensor assembly according to claim 11, wherein the cracks are provided such that the conductive paths are provided in the sensor thin film in a no-load state before the bending deformation occurs, and the cracks are opened up to cut off the conductive paths when the bending deformation occurs.
13. A sensor module comprising:
a sensor assembly; and
a circuit case on which the sensor assembly is installed, wherein the sensor assembly comprises:
a sensor element; and
an exterior packaging bag enclosing the sensor element,
the sensor element comprises:
- a sensor thin film comprising one of resin and elastomer; and
- at least one pair of electrodes connected to the sensor thin film, the exterior packaging bag comprises a laminate film having a metal foil and two resin layers sandwiching the metal foil the exterior packaging bag of the sensor assembly has an opening;

the sensor element has a wiring unit projecting out of the exterior packaging bag from the opening; and the circuit case has a box-like shape and comprises
- a case body on which an assembly mounting opening is provided;
- a packing member sealing the assembly mounting opening in a state in which the wiring unit projects out from the opening of the exterior packaging bag and being installed on the assembly mounting opening of the case body; and
- a connector connected to the wiring unit inside the case body and to an electrical circuit.

* * * * *